United States Patent
Watanabe et al.

(10) Patent No.: US 8,675,700 B2
(45) Date of Patent: Mar. 18, 2014

(54) LASER SYSTEM AND LASER LIGHT GENERATION METHOD

(75) Inventors: Shuntaro Watanabe, Kashiwa (JP); Takashi Onose, Oyama (JP); Osamu Wakabayashi, Hiratsuka (JP)

(73) Assignee: Gigaphoton, Inc., Oyama-shi, Tochigi (JP)

( * ) Notice: Subject to any disclaimer, the term of this patent is extended or adjusted under 35 U.S.C. 154(b) by 0 days.

(21) Appl. No.: 13/427,556

(22) Filed: Mar. 22, 2012

(65) Prior Publication Data

US 2012/0250709 A1 Oct. 4, 2012

(30) Foreign Application Priority Data

Mar. 28, 2011 (JP) ................. 2011-071167

(51) Int. Cl.
*H01S 3/10* (2006.01)
(52) U.S. Cl.
USPC ............ 372/25; 372/57; 372/55; 372/9
(58) Field of Classification Search
USPC ............................. 372/25, 57, 55, 9
See application file for complete search history.

(56) References Cited

U.S. PATENT DOCUMENTS

| | | |
|---|---|---|
| 5,233,460 A | 8/1993 | Partlo et al. |
| 5,434,662 A | 7/1995 | Rockwell et al. |
| 5,760,408 A | 6/1998 | Kikuchi et al. |
| 6,470,122 B1 | 10/2002 | Doumuki |
| 6,554,464 B1 | 4/2003 | Hawryluk et al. |
| 6,693,930 B1 | 2/2004 | Chuang et al. |
| 6,738,105 B1 * | 5/2004 | Hannah et al. ............. 348/745 |
| 6,898,216 B1 | 5/2005 | Kleinschmidt |
| 7,305,015 B2 | 12/2007 | Uto et al. |
| 7,391,558 B2 | 6/2008 | Betin et al. |
| 7,796,326 B1 * | 9/2010 | Shay et al. ............... 359/349 |
| 2007/0086492 A1 * | 4/2007 | Betin et al. ................ 372/9 |
| 2008/0192327 A1 | 8/2008 | Abu-ageel |
| 2009/0067468 A1 | 3/2009 | Brown et al. |
| 2010/0002731 A1 | 1/2010 | Kimura et al. |

* cited by examiner

Primary Examiner — Kinam Park
(74) Attorney, Agent, or Firm — Hogan Lovells US LLP

(57) ABSTRACT

A laser system in this disclosure may include: a master oscillator configured to output pulsed laser light, a coherence reduction optical system configured to reduce coherence of the pulsed laser light from the master oscillator, and a controller configured to control the coherence reduction optical system so that a speckle of the pulsed laser light varies.

15 Claims, 19 Drawing Sheets

LASER SYSTEM AND LASER LIGHT GENERATION METHOD

CROSS-REFERENCE TO RELATED APPLICATION

The present application claims priority from Japanese Patent Application No. 2011-071167 filed Mar. 28, 2011.

BACKGROUND

1. Technical Field

This disclosure relates to a laser system and a laser light generation method.

2. Related Art

Typical excimer lasers as ultraviolet light sources for use in semiconductor lithography are KrF excimer lasers whose output wavelength is approximately 248 nm and ArF excimer lasers whose output wavelength is approximately 193 nm.

Most of the ArF excimer lasers are marketed as two-stage laser systems including an oscillator stage laser and an amplifier stage. Common major components of the oscillator stage laser and the amplifier stage in two-stage ArF excimer laser systems include the following. The oscillator stage laser includes a first chamber, while the amplifier stage includes a second chamber. The first and second chambers contain laser gas (mixture gas of $F_2$, Ar, Ne, and Xe) sealed therein. The oscillator stage laser and the amplifier stage are provided with a power supply for supplying electric energy for exciting the laser gas. The oscillator stage laser and the amplifier stage may have separate power supplies or share a common power supply. Inside the first chamber, first discharge electrodes including a first anode and a first cathode that are connected to the power supply are provided. In a similar manner, second discharge electrodes including a second anode and a second cathode that are connected to the power supply are provided inside the second chamber.

The specific features of the oscillator stage laser include, for example, a line narrowing module. The line narrowing module typically includes a grating and at least one prism beam expander. A semitransparent mirror and the grating constitute an optical resonator. The first chamber of the oscillator stage laser is arranged between the semitransparent mirror and the grating.

When an electric discharge occurs between the first anode and the first cathode of the first discharge electrodes, the laser gas is excited, to thereby emitting light upon releasing the excitation energy. The light is then subjected to wavelength selection by the line narrowing module and the resulting light is output as laser light from the oscillator stage laser.

A two-stage laser system whose amplifier stage is a laser including a resonator is called a master oscillator/power oscillator (MOPO), while a two-stage laser system whose amplifier stage is not a laser without a resonator is called a master oscillator/power amplifier (MOPA). When laser light from the oscillator stage laser is present in the second chamber of the amplifier stage, control is performed so that an electric discharge occurs between the second anode and the second cathode of the second discharge electrodes. As a result, the laser gas in the second chamber is excited, the laser light is amplified, and the resulting light is output from the amplifier stage.

SUMMARY

A laser system according to one aspect of this disclosure may include: a master oscillator configured to output pulsed laser light, a coherence reduction optical system configured to reduce coherence of the pulsed laser light from the master oscillator, and a controller configured to control the coherence reduction optical system so that a speckle of the pulsed laser light varies.

A laser light generation method according to another aspect of this disclosure may be a laser light generation method performed by an apparatus including a master oscillator configured to output pulsed laser light and a coherence reduction optical system configured to reduce coherence of the pulsed laser light from the master oscillator, and may include controlling the coherence reduction optical system so that a speckle of the pulsed laser light varies.

BRIEF DESCRIPTION OF DRAWINGS

Some embodiments of this disclosure will be described below by way of example with reference to the accompanying drawings.

DESCRIPTION OF PREFERRED EMBODIMENTS

Selected embodiments of this disclosure will be described in detail with reference to the accompanying drawings. The embodiments described below are for illustrative purposes only, and are in no way intended to unduly limit what is described in this disclosure. In addition, not all the structures or operations described in these embodiments are indispensable to put this disclosure into practice. It should be noted that the same numerals refer to the same components and duplicated description thereof is omitted. The description will be given in the order below.

Table of Contents

1. Overview
2. Definition of Terms
3. ArF Amplifier Laser System Including Master Oscillator Having Wavelength Conversion Device: First Embodiment
   3.1 Structure
   3.2 Operations
4. Coherence Reduction Optical System Including Random Phase Plate: Second Embodiment
   4.1 Rotator for Random Phase Plate: First Example
      4.1.1 Random Phase Plate
   4.2 Combination of Random Phase Plate and Laser Beam Angle Control Mechanism
      4.2.1 Use of Wedge substrate as Laser Beam Angle Control Mechanism: Second Example
      4.2.2 Use of Highly Reflective Mirror as Laser Beam Angle Control Mechanism: Third Example
   4.3 Combination of Random Phase Plate and Laser Beam Parallel Translation Mechanism
      4.3.1 Use of Plane Parallel Plate as Laser Beam Parallel Translation Mechanism: Fourth Example
      4.3.2 Use of Highly Reflective Mirrors as Laser Beam Parallel Translation Mechanism: Fifth Example
5. Laser System Employing Master Oscillator Including Coherence Reduction Optical System in Combination with ArF Amplifier: Third Embodiment
   5.1 Structure
   5.2 Operations
   5.3 Action
   5.4 Flowchart
      5.4.1 Control under Given Control Amount
         5.4.1.1 Flowchart in First Example
         5.4.1.2 Flowchart in Second Example
         5.4.1.3 Flowchart in Fourth Example
      5.4.2 Control under Random Control Amount
         5.4.2.1 Flowchart in First Example
         5.4.2.2 Flowchart in Second Example
         5.4.2.3 Flowchart in Fourth Example

1. Overview

In the embodiments described below, a coherence reduction optical system may be arranged in the optical path between a master oscillator (MO) and a power oscillator (PO) or between a master oscillator (MO) and a power amplifier (PA). The coherence reduction optical system may be controlled so that speckle of pulsed laser light is shifted for every pulsed laser light.

2. Definition of Terms

KBBF crystal is a nonlinear optical crystal represented by the chemical formula: $KBe_2BO_3F_2$ and serves as a wavelength conversion element. Burst oscillation means generating pulsed laser light at a predetermined repetition rate for a predetermined period. An optical path means a path through which laser light propagates.

Figure 1:
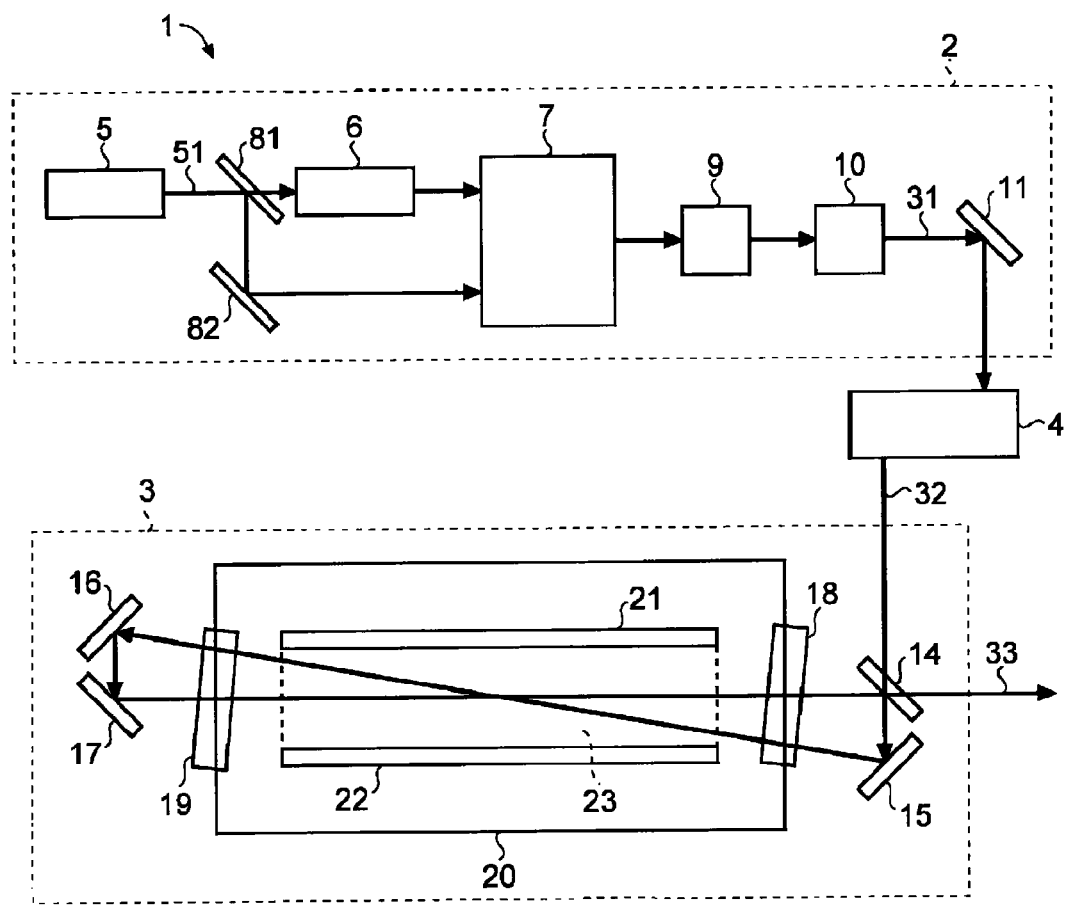
FIG. 1 is a schematic view illustrating an example of a solid-state laser device including a wavelength conversion element and a two-stage laser apparatus using the solid-state laser device in a first embodiment of this disclosure.

3. ArF Amplifier Laser System Including Master Oscillator Having Wavelength Conversion Device: First Embodiment 3.1 Structure FIG. 1 is a schematic view illustrating an example of a two-stage laser apparatus in a first embodiment of this disclosure. This two-stage laser apparatus (hereinafter referred to as a "laser system") 1 may include a master oscillator 2 and an amplifying apparatus 3. The master oscillator 2 may include a wavelength conversion element, for example. The amplifying apparatus 3 may be a discharge-excited ArF excimer amplifier, for example. Between the master oscillator 2 and the amplifying apparatus 3, a coherence reduction optical system 4 may be provided. Examples of the coherence reduction optical system 4 may include an optical pulse stretcher, a random phase plate, or other systems.

The master oscillator 2 will now be described. The master oscillator 2 may include a pumping laser 5, a Ti:sapphire laser 6, an amplifier 7, a beam splitter 81, a highly reflective mirror 82, a lithium triborate (LBO) crystal 9, a KBBF crystal 10, and a highly reflective mirror 11.

The pumping laser 5 may be a laser that generates second harmonic light of a semiconductor laser-excited Nd:YAG laser. The Ti:sapphire laser 6 may include a Ti:sapphire crystal and an optical resonator. The amplifier 7 may include a Ti:sapphire crystal.

The amplifying apparatus 3 will now be described. The amplifying apparatus 3 may include a chamber 20, a pair of discharge electrodes (namely, an anode 21 and a cathode 22), an output coupling mirror 14, highly reflective mirrors 15, 16, and 17. The chamber 20 may contain laser gas sealed therein. This laser gas may be a mixture of Ar, Ne, $F_2$, and Xe gases. The anode 21 and the cathode 22 may be housed in the chamber 20. The anode 21 and the cathode 22 may be arranged with a space therebetween in a direction along the plane of FIG. 1. The anode 21 and the cathode 22 may be arranged perpendicular to the plane of FIG. 1. A space between the anode 21 and the cathode 22 may be a discharge space 23. The chamber 20 may be provided with windows 18 and 19 through which pulsed laser light 32 passes. In addition, a power supply (not illustrated) may be provided outside the chamber 20.

The output coupling mirror 14 and the highly reflective mirrors 15, 16, and 17 may constitute an optical ring resonator. The output coupling mirror 14 may be an element for allowing part of the light to pass therethrough and reflecting the other part of the light.

3.2 Operations

The master oscillator 2 may output pulsed laser light 31 at a wavelength of approximately 193 nm. The coherence reduction optical system 4 may reduce the coherence of the pulsed laser light 31. The amplifying apparatus 3 may amplify pulsed laser light 32 whose coherence has been reduced and output the resultant light as pulsed laser light 33. The pulsed laser light 33 may be sent to a semiconductor exposure apparatus (not illustrated) and used for exposure processing.

The pumping laser 5 may output excitation light (also referred to as pumping light) 51 at a wavelength of approximately 532 nm. Part of the excitation light 51 may pass through the beam splitter 81. The other part of the excitation light 51 may be reflected by the beam splitter 81. The excitation light 51 having passed through the beam splitter 81 may excite the Ti:sapphire crystal in the Ti:sapphire laser 6. The Ti:sapphire laser 6 thus excited may output pulsed laser light at a wavelength of approximately 773.6 nm. The Ti:sapphire laser 6 may include an optical resonator having a wavelength selection element (not illustrated). Accordingly, the Ti:sapphire laser 6 may output pulsed laser light whose spectral linewidth has been narrowed by the wavelength selection element.

Of the excitation light 51 having been output from the pumping laser 5, the light reflected by the beam splitter 81 may be reflected again by the highly reflective mirror 82. The excitation light 51 thus reflected may enter the Ti:sapphire amplifier 7 and excite the Ti:sapphire crystal included in the amplifier. With this excitation energy, the amplifier 7 may amplify the pulsed laser light output from the Ti:sapphire laser 6. As a result, the amplifier 7 may output pulsed laser light at a wavelength of approximately 773.6 nm.

The pulsed laser light output from the Ti:sapphire amplifier 7 may pass through the LBO crystal 9, serving as a wavelength conversion element, to be converted into pulsed laser light at a wavelength of approximately 386.8 nm (half the aforementioned wavelength 773.6 nm). The pulsed laser light whose wavelength has been converted may pass through the KBBF crystal 10, serving as a wavelength conversion element, to be converted into the pulsed laser light 31 at a wavelength of approximately 193.4 nm (half the aforementioned wavelength 386.8 nm).

The pulsed laser light 31 having passed through the KBBF crystal 10 may be directed by the reflective mirror 11 to enter the coherence reduction optical system 4. The coherence of the pulsed laser light 31 may be reduced upon passing through the coherence reduction optical system 4. The pulsed laser light 32 whose coherence has been reduced may enter the amplifying apparatus 3.

A power supply electrically connected to the anode 21 and the cathode 22 in the chamber 20 may apply a potential difference between the anode 21 and the cathode 22. This may cause a discharge between the anode 21 and the cathode 22 every time the pulsed laser light 32 passes through the discharge space 23 in the amplifying apparatus 3.

Part of the pulsed laser light 32 output from the coherence reduction optical system 4 may pass through the output coupling mirror 14 and be reflected by the highly reflective mirror 15. This pulsed laser light 32 may pass through the window 18 and enter the discharge space 23 between the anode 21 and the cathode 22. Control may be made to cause a discharge in the discharge space 23 with the presence of this pulsed laser light 32 in the discharge space 23, thereby amplifying the pulsed laser light 32. The pulsed laser light 32 thus amplified may be output from the chamber 20 through the window 19. The pulsed laser light 32 thus output may be highly reflected by the highly reflective mirrors 16 and 17 and enter the discharge space 23 in the chamber 20 through the window 19 again. This pulsed laser light 32 may then be output from the chamber 20 through the window 18. This pulsed laser light 32 thus output may be incident on the output coupling mirror 14. Part of this pulsed laser light 32 may pass through the output coupling mirror 14 and be output from the amplifying apparatus 3 as pulsed laser light 33. The other part of this pulsed laser light 32 may be reflected by the output coupling mirror 14 and returned to the optical ring resonator as feedback light.

While the description above pertains to an example in which the amplifying apparatus 3 includes an optical ring resonator, embodiments are not limited thereto. For example, the amplifying apparatus 3 may include a Fabry-Perot resonator in which an optical resonator is provided in an amplifier.

4. Coherence Reduction Optical System Including Random Phase Plate: Second Embodiment Specific examples of the coherence reduction optical system 4 will now be described in detail with reference to some drawings. The coherence reduction optical system 4 and coherence reduction optical systems 4A to 4E described below may be included in the master oscillator 2 or a master oscillator 2A described later.

4.1 Rotator for Random Phase Plate: First Example

Figure 2:
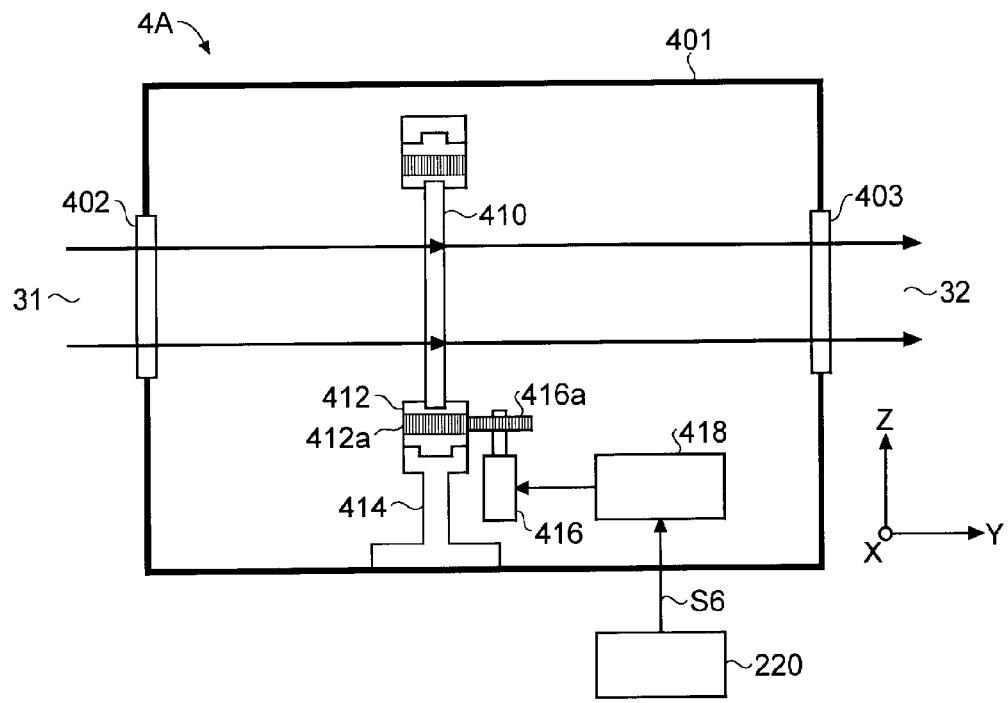
FIG. 2 is a schematic view illustrating a coherence reduction optical system in a first example of a second embodiment of this disclosure.
Figure 3:
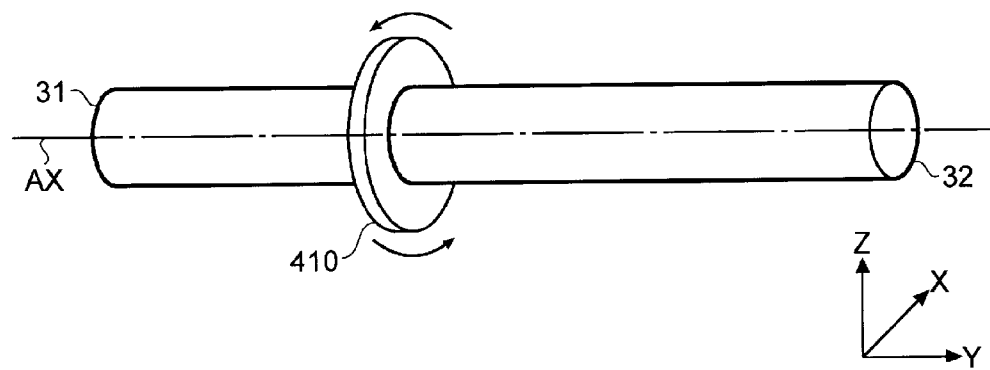
FIG. 3 is a diagram illustrating a random phase plate in FIG. 2.

FIG. 2 is a schematic view illustrating the coherence reduction optical system 4A in a first example of a second embodiment. FIG. 3 is a diagram illustrating a random phase plate 410 in FIG. 2.

As illustrated in FIG. 2, the coherence reduction optical system 4A may include the random phase plate 410, a plate holder 412, a support 414, a motor 416, and a motor driver 418. The random phase plate 410, the plate holder 412, the support 414, the motor 416, and the motor driver 418 may be housed in a chamber 401. The chamber 401 may be provided with windows 402 and 403.

The pulsed laser light 31 output from the master oscillator 2 may enter the chamber 401 through the window 402. The pulsed laser light 31 having entered the chamber 401 may pass through the random phase plate 410. The pulsed laser light 31 having passed through the random phase plate 410 may be output as the pulsed laser light 32 from the chamber 401 through the window 403.

The random phase plate 410, which is disc-shaped, may be held by the plate holder 412, which is ring-shaped. The plate holder 412 may be rotatably held by the support 414. The plate holder 412 may be provided with a gear 412a so as to surround the random phase plate 410. The gear 412a may engage with a gear 416a of the motor 416. The motor 416 may be driven by a drive current supplied from the motor driver 418, thereby rotating the plate holder 412. As a result, the random phase plate 410 may rotate about an axis on which the random phase plate 410 centers and which is perpendicular to the random phase plate 410 as illustrated in FIG. 3 (the axis coincides with the beam axis AX of the pulsed laser light 31 in FIG. 3). The plate holder 412, the motor 416, and the motor driver 418 may thus serve as a rotation mechanism for rotating the random phase plate 410.

While the motor driver 418 may receive a control signal S6 for rotating the random phase plate 410 by a predetermined rotational angle Δθ for every pulsed laser light from an external device 220, embodiments are not limited thereto. Alternatively, the motor driver 418 may successively receive an instruction signal for rotating the random phase plate 410 at a predetermined angular speed from the external device 220.

4.1.1 Random Phase Plate

Figure 4:
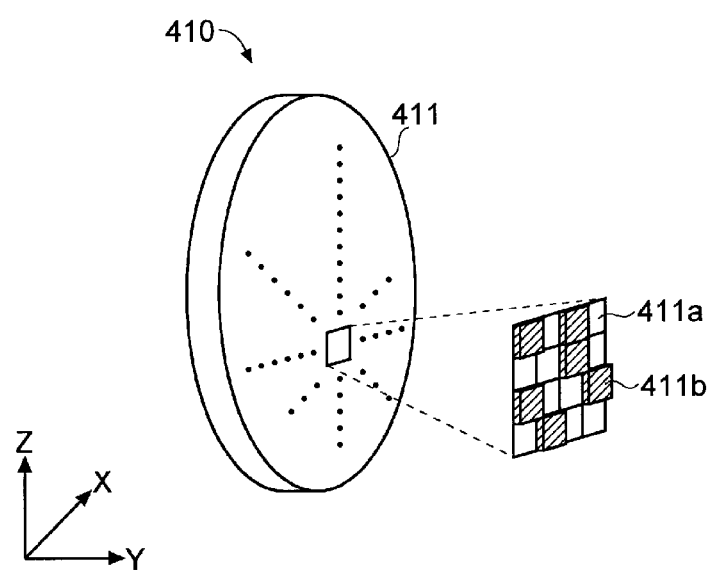
FIG. 4 is a diagram illustrating an example of the random phase plate in FIG. 3.

An example of the random phase plate 410 is illustrated in FIG. 4. As illustrated in FIG. 4, the random phase plate 410 may include a disc-shaped transparent plate 411 having a surface on which rectangular cells 411a and 411b are two-dimensionally arranged in a random fashion. The plate may have different thicknesses for the cells 411a and 411b. The phase of the pulsed laser light 31 having passed through the cells 411b may be shifted by R with respect to the phase of the pulsed laser light 31 having passed through the cells 411a.

On the surface provided with the cells 411a and 411b, the total area of the cells 411a and the total area of the cells 411b may be equal to each other. Each of the cells 411a and 411b may be a polygon. A side of each of the cells 411a and 411b may be approximately 20 μm long, for example.

The space coherence of the pulsed laser light 31 having passed through the random phase plate 410 can be reduced due to interaction between the diffraction by the cells 411a and 411b and random space phase changes. The pulsed laser light 31 having passed through the random phase plate 410 can cause speckles corresponding to the phase relationship of the random phase plate 410.

Rotating the random phase plate 410 can vary the phase shift distribution of the pulsed laser light 31 having passed through the random phase plate 410. This can vary speckles of the pulsed laser light 32 having passed through the random phase plate 410. Through the integration of the pulsed laser light 32 that may have different speckles therein, the distribution of speckles, if any, can be averaged. As a result, the speckles of the pulsed laser light 32 can be reduced substantially.

The structure for rotating the random phase plate 410 will not change the beam axis AX of the pulsed laser light 32. Accordingly, the loss of the pulsed laser light 31 can be kept small. In addition, an increase in the divergence of the pulsed laser light 32 due to changes in the beam axis AX will be suppressed.

While the example above pertains to the random phase plate 410 that is light-transmissive, embodiments are not limited thereto. For example, a reflective random phase plate may be used instead.

Figure 5:
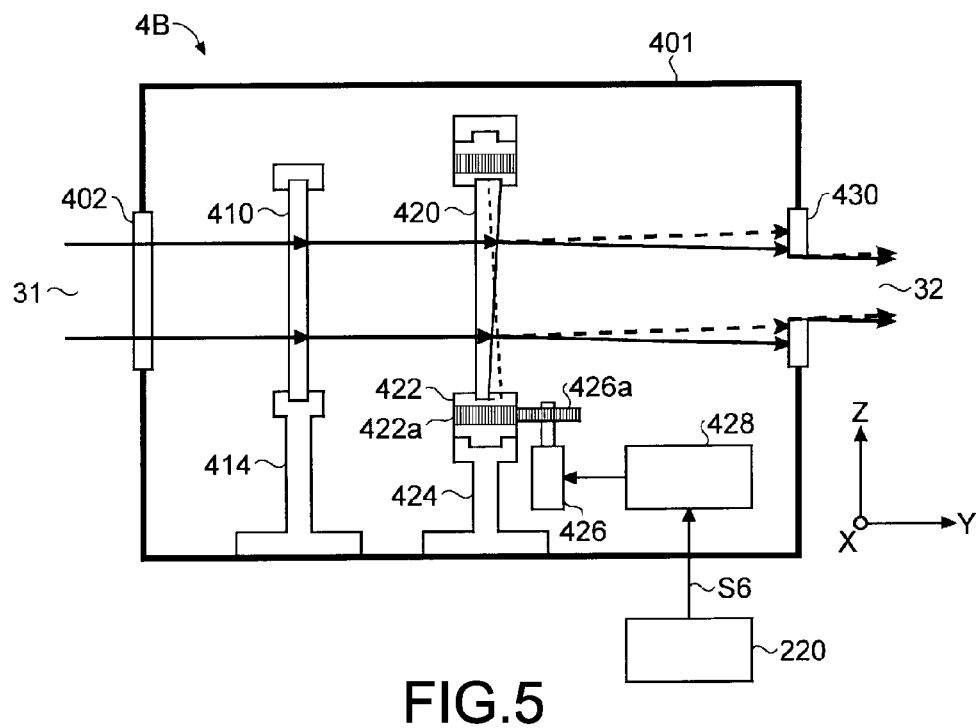
FIG. 5 is a schematic view illustrating a coherence reduction optical system in a second example of the second embodiment.
Figure 6:
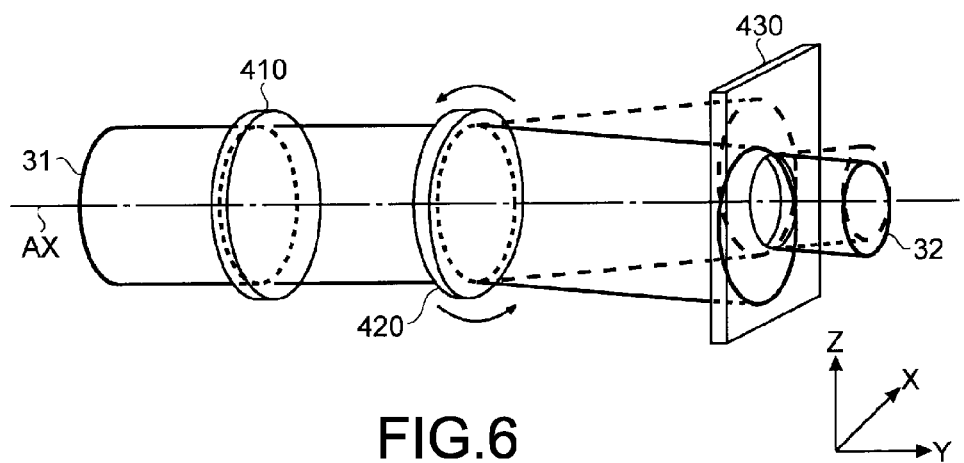
FIG. 6 is a diagram illustrating a random phase plate and a wedge substrate in FIG. 5.

4.2 Combination of Random Phase Plate and Laser Beam Angle Control Mechanism 4.2.1 Use of Wedge Substrate as Laser Beam Angle Control Mechanism: Second Example FIG. 5 is a schematic view illustrating the coherence reduction optical system 4B in a second example of the second embodiment. FIG. 6 is a diagram illustrating the random phase plate 410 and a wedge substrate 420 in FIG. 5.

As illustrated in FIG. 5, the coherence reduction optical system 4B may include the random phase plate 410, the support 414, the wedge substrate 420 that is transparent, a plate holder 422, another support 424, a motor 426, and a motor driver 428. The random phase plate 410, the support 414, the wedge substrate 420, the plate holder 422, the support 424, the motor 426, and the motor driver 428 may be housed in the chamber 401. The chamber 401 may be provided with the window 402 and a slit 430.

The pulsed laser light 31 having entered the chamber 401 through the window 402 may pass through the random phase plate 410. The random phase plate 410 may be fixed by the support 414.

The pulsed laser light 31 having passed through the random phase plate 410 may pass through the wedge substrate 420. The wedge substrate 420, which is disc-shaped, may have one surface tilted at a predetermined degree to the other surface. The disc-shaped wedge substrate 420 may have an output surface tilted to an input surface on which the pulsed laser light 31 is incident. The wedge substrate 420 may be held by the plate holder 422, which is ring-shaped. The plate holder 422 may be rotatably held by the support 424. The plate holder 422 may be provided with a gear 422a so as to surround the wedge substrate 420. The gear 422a may engage with a gear 426a of the motor 426. The motor 426 may be driven by a drive current supplied from the motor driver 428, thereby rotating the plate holder 422. As a result, the wedge substrate 420 may rotate about an axis on which the wedge substrate 420 centers and which is perpendicular to the wedge substrate 420 as illustrated in FIG. 6 (the axis coincides with the beam axis AX of the pulsed laser light 31 in FIG. 6). The plate holder 422, the motor 426, and the motor driver 428 may thus serve as a rotation mechanism for rotating the wedge substrate 420.

While the motor driver 428 may receive a control signal S6 for rotating the wedge substrate 420 by a predetermined rotational angle Δβ for every pulsed laser light from the external device 220, embodiments are not limited thereto. Alternatively, the motor driver 428 may successively receive an instruction signal for rotating the wedge substrate 420 at a predetermined angular speed from the external device 220.

The orientation of the beam axis AX of the pulsed laser light 31 whose space coherence has been reduced upon passing through the random phase plate 410 can be changed by a predetermined angle upon passing through the wedge substrate 420. Rotating the wedge substrate 420 can vary positions at which speckles of the pulsed laser light 32 occur. Through the integration of the pulsed laser light 32 having speckles at different positions therein, the distribution of speckles can be averaged. As a result, the speckles of the pulsed laser light 32 can be reduced substantially.

The pulsed laser light 31 having passed through the wedge substrate 420 may be shaped to have a certain beam cross section upon passing through the slit 430. The wedge substrate 420 and the structure for rotating the wedge substrate 420 may be arranged upstream from the random phase plate 410 along the optical path of the pulsed laser light 31.

Figure 7:
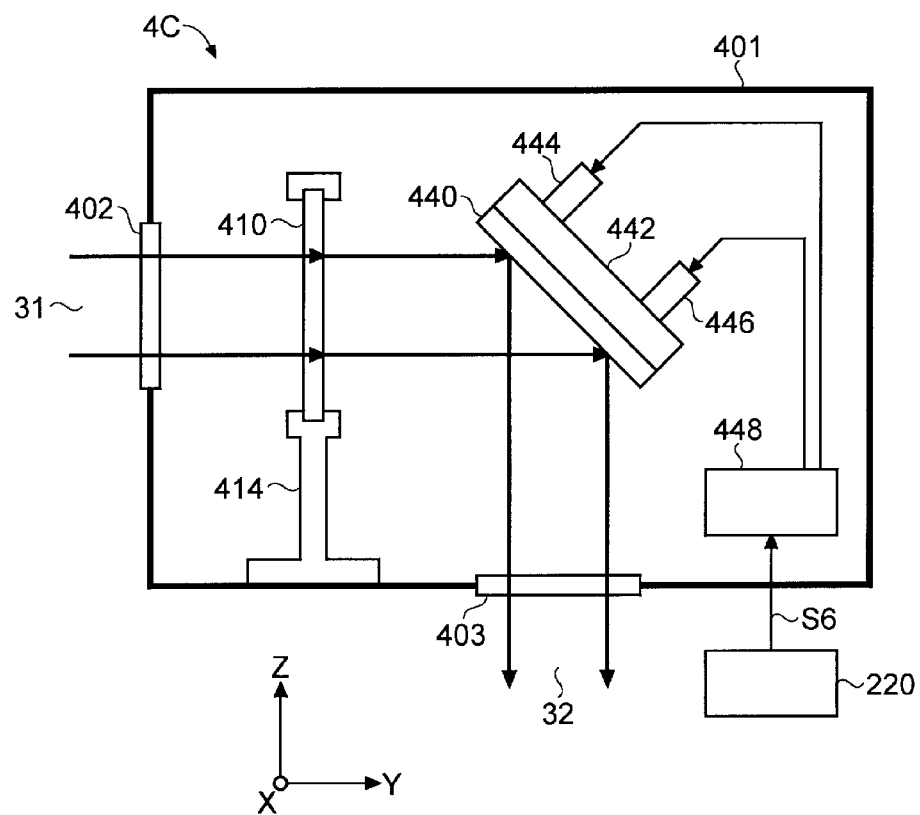
FIG. 7 is a schematic view illustrating a coherence reduction optical system in a third example of the second embodiment.

4.2.2 Use of Highly Reflective Mirror as Laser Beam Angle Control Mechanism: Third Example FIG. 7 is a schematic view illustrating the coherence reduction optical system 4C in a third example of the second embodiment. As illustrated in FIG. 7, the coherence reduction optical system 4C may include the random phase plate 410, the support 414, a highly reflective mirror 440, a two-axis tilt stage 442, and a motor driver 448. The random phase plate 410, the support 414, the highly reflective mirror 440, the two-axis tilt stage 442, and the motor driver 448 may be housed in the chamber 401. The chamber 401 may be provided with the windows 402 and 403.

The pulsed laser light 31 having entered the chamber 401 through the window 402 may pass through the random phase plate 410. The random phase plate 410 may be fixed by the support 414.

The pulsed laser light 31 having passed through the random phase plate 410 may be reflected by the highly reflective mirror 440. The highly reflective mirror 440 may be held by the two-axis tilt stage 442. The two-axis tilt stage 442 may be provided with motors 444 and 446, for example. The motors 444 and 446 may be driven by a drive current supplied from the motor driver 448, thereby changing the tilt of the two-axis tilt stage 442 by θx in an X-axis rotational direction and by θy in a Y-axis rotational direction. As a result, the tilt of the mirror surface of the highly reflective mirror 440 may be changed by θx in the X-axis rotational direction and by θy in the Y-axis rotational direction.

While the motor driver 448 may receive a control signal S6 for changing the tilt of the highly reflective mirror 440 by a predetermined angle Δθ (Δθx, Δθy) for every pulsed laser light 31 from the external device 220, embodiments are not limited thereto. Alternatively, the motor driver 448 may successively receive an instruction signal for continuously changing the tilt of the highly reflective mirror 440 from the external device 220.

The orientation of the beam axis AX of the pulsed laser light 31 whose space coherence has been reduced upon passing through the random phase plate 410 may be changed upon being reflected by the highly reflective mirror 440. Changing the angle of the tilt of the highly reflective mirror 440 can vary positions at which speckles of the pulsed laser light 32 occur. Through the integration of the pulsed laser light 32 having speckles at different positions therein, the distribution of speckles can be averaged. As a result, the speckles of the pulsed laser light 32 can be reduced substantially.

The highly reflective mirror 440 and the structure for tilting the highly reflective mirror 440 may be arranged upstream from the random phase plate 410 along the optical path of the pulsed laser light 31.

Figure 8:
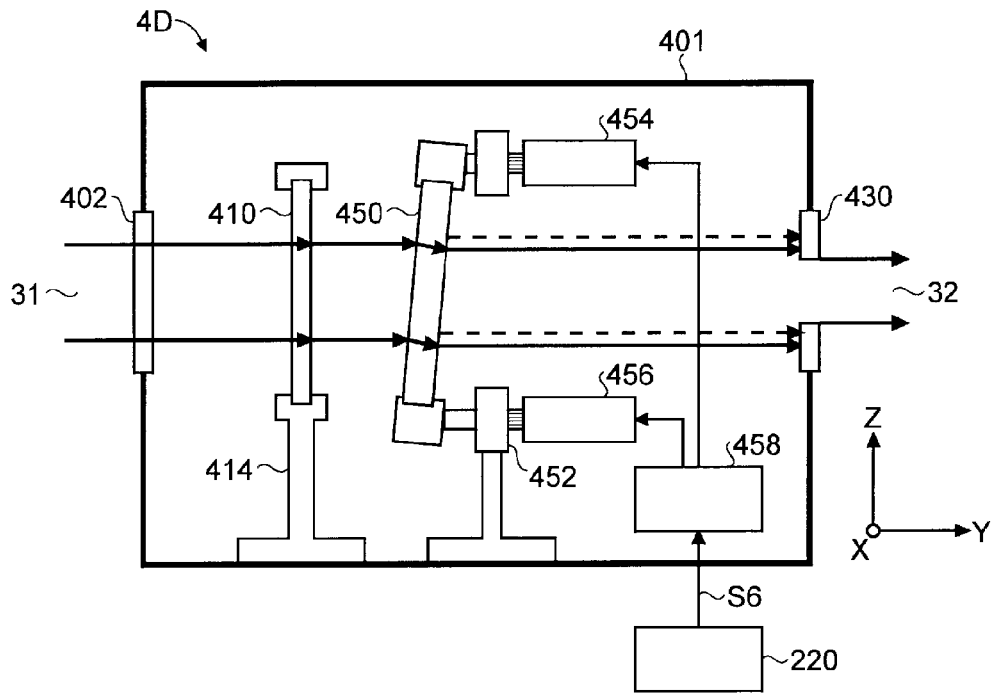
FIG. 8 is a schematic view illustrating a coherence reduction optical system in a fourth example of the second embodiment.
Figure 9:
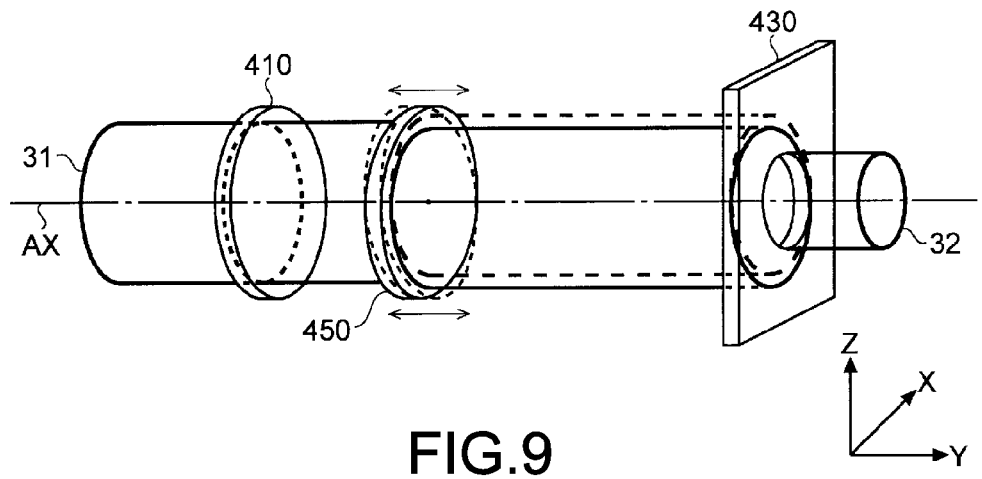
FIG. 9 is a diagram illustrating a random phase plate and a plane parallel plate in FIG. 8.

4.3 Combination of Random Phase Plate and Laser Beam Parallel Translation Mechanism 4.3.1 The Use of Plane Parallel Plate as Laser Beam Parallel Translation Mechanism: Fourth Example FIG. 8 is a schematic view illustrating the coherence reduction optical system 4D in a fourth example of the second embodiment. FIG. 9 is a diagram illustrating the random phase plate 410 and a plane parallel plate 450 in FIG. 8.

As illustrated in FIG. 8, the coherence reduction optical system 4D may include the random phase plate 410, the support 414, the plane parallel plate 450 that is transparent, a two-axis tilt stage 452, and a motor driver 458. The random phase plate 410, the support 414, the plane parallel plate 450, the two-axis tilt stage 452, and the motor driver 458 may be housed in the chamber 401. The chamber 401 may be provided with the window 402 and the slit 430.

The pulsed laser light 31 having entered the chamber 401 through the window 402 may pass through the random phase plate 410. The random phase plate 410 may be fixed by the support 414.

The pulsed laser light 31 having passed through the random phase plate 410 may pass through the plane parallel plate 450. The plane parallel plate 450 may be held by the two-axis tilt stage 452. The two-axis tilt stage 452 may be provided with motors 454 and 456, for example. The motors 454 and 456 may be driven by a drive current supplied from the motor driver 458, thereby changing the tilt of the two-axis tilt stage 452 by θx in the X-axis rotational direction and by θy in the Y-axis rotational direction. As a result, the tilt of the plane parallel plate 450 may be changed by θx in the X-axis rotational direction and by θy in the Y-axis rotational direction.

While the motor driver 458 may receive a control signal S6 for changing the tilt of the plane parallel plate 450 by a predetermined angle Δθ (Δθx, Δθy) for every pulsed laser light 31 from the external device 220, embodiments are not limited thereto. Alternatively, the motor driver 458 may successively receive an instruction signal for continuously changing the tilt of the plane parallel plate 450 from the external device 220.

The beam axis AX of the pulsed laser light 31 whose space coherence has been reduced upon passing through the random phase plate 410 may be shifted in a direction perpendicular to the beam axis AX upon passing through the plane parallel plate 450 in a manner corresponding to the tilt of the plane parallel plate 450. Changing the angle of the tilt of the plane parallel plate 450 can vary positions at which speckles of the pulsed laser light 32 occur. Through the integration of the pulsed laser light 32 having speckles at different positions therein, the distribution of speckles can be averaged. As a result, the speckles of the pulsed laser light 32 can be reduced substantially.

The pulsed laser light 31 having passed through the plane parallel plate 450 may be shaped to have a certain beam cross section upon passing through the slit 430. The structure for tilting the plane parallel plate 450 causes parallel translation of the beam axis AX, thereby suppressing an increase in the divergence of the pulsed laser light 32 due to changes in the beam axis AX. The plane parallel plate 450 and the structure for tilting the plane parallel plate 450 may be arranged upstream from the random phase plate 410 along the optical path of the pulsed laser light 31.

Figure 10:
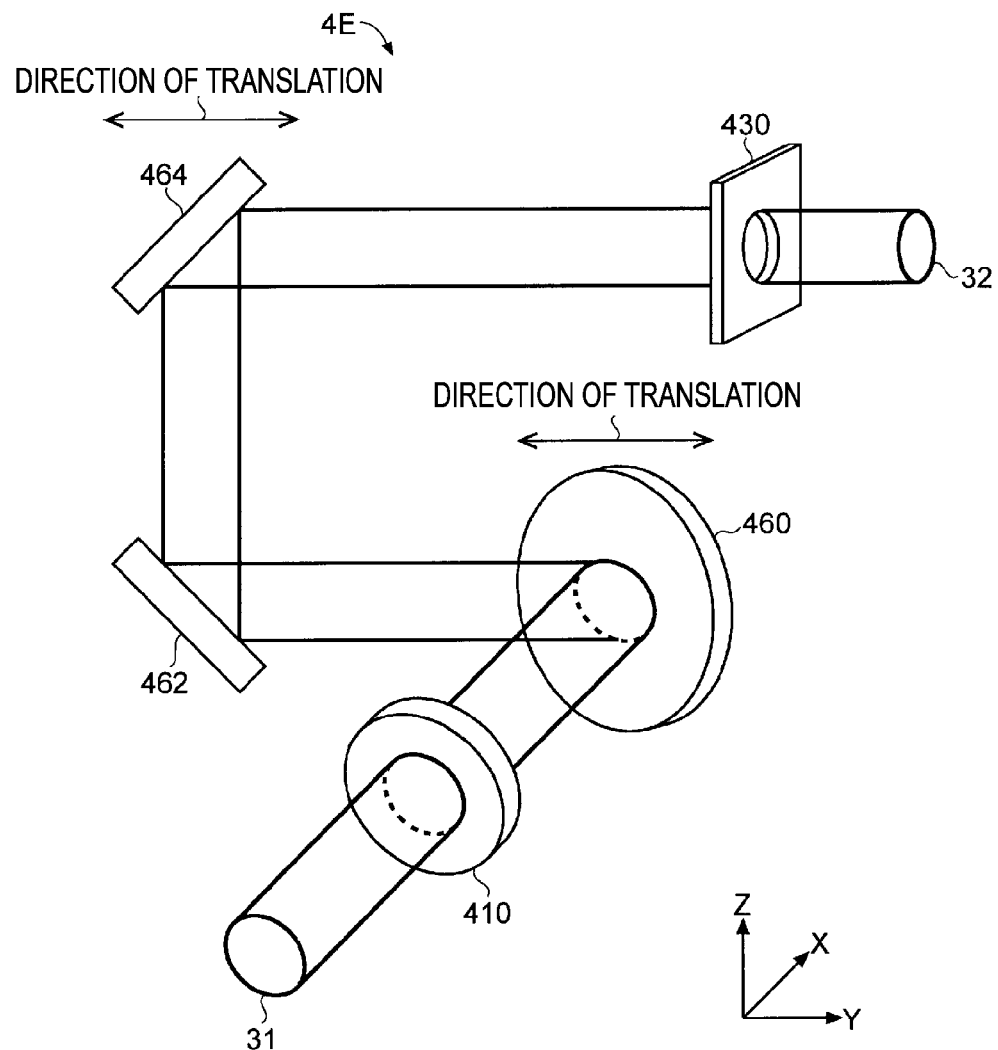
FIG. 10 is a schematic view illustrating a coherence reduction optical system in a fifth example of the second embodiment.

4.3.2 Use of Highly Reflective Mirrors as Laser Beam Parallel Translation Mechanism: Fifth Example FIG. 10 is a schematic view illustrating the coherence reduction optical system 4E in a fifth example of the second embodiment. As illustrated in FIG. 10, the coherence reduction optical system 4E may include the random phase plate 410 and highly reflective mirrors 460, 462, and 464. The random phase plate 410 and the highly reflective mirrors 460, 462, and 464 may be housed in a chamber (not illustrated). The chamber may be provided with a window and the slit 430.

The pulsed laser light 31 having entered the chamber 401 through the window may pass through the random phase plate 410. The random phase plate 410 may be fixed by a support (not illustrated).

The pulsed laser light 31 having passed through the random phase plate 410 may be reflected by the highly reflective mirror 460. The highly reflective mirror 460 may be translated in parallel in the Y-axis direction by a shifting mechanism (not illustrated). Alternatively, the highly reflective mirror 460 may be translated in parallel in the X-axis direction by a shifting mechanism (not illustrated). Such a shifting mechanism may be provided with a motor (not illustrated). The motor may be driven by a drive current supplied from a motor driver (not illustrated), thereby causing parallel translation of the highly reflective mirror 460. As a result, the optical path length from the random phase plate 410 to the highly reflective mirror 460 may be changed.

While the motor driver may receive an instruction signal for shifting the highly reflective mirror 460 by a predetermined distance for every pulsed laser light 31 from an external device (not illustrated), embodiments are not limited thereto. Alternatively, the motor driver may successively receive an instruction signal for continuously shifting the highly reflective mirror 460 from the external device.

The traveling direction of the pulsed laser light 31 whose space coherence has been reduced upon passing through the random phase plate 410 may be changed upon being reflected by the highly reflective mirror 460. Changing the optical path length from the highly reflective mirror 460 to the random phase plate 410 can shift the beam axis in a direction perpendicular thereto in a manner corresponding to the change in the optical path length. As a result, parallel translation of the highly reflective mirror 460 can vary positions at which speckles of the pulsed laser light 32 occur. Through the integration of the pulsed laser light 32 having speckles at different positions therein, the distribution of speckles can be averaged. As a result, the speckles of the pulsed laser light 32 can be reduced substantially.

The pulsed laser light 31 reflected by the highly reflective mirror 460 may be reflected by the highly reflective mirror 462. The pulsed laser light 31 reflected by the highly reflective mirror 462 may be reflected by the highly reflective mirror 464. The highly reflective mirror 464 may be translated in parallel in the Y-axis direction by a shifting mechanism (not illustrated). Alternatively, the highly reflective mirror 464 may be translated in parallel in the Z-axis direction by a shifting mechanism (not illustrated). Such a shifting mechanism may be provided with a motor (not illustrated). The motor may be driven by a drive current supplied from a motor driver (not illustrated), thereby causing parallel translation of the highly reflective mirror 464. As a result, the optical path length from the highly reflective mirror 460 to the highly reflective mirror 464 may be changed. Instead of the highly reflective mirror 464, the highly reflective mirror 462 may be translated in parallel in the same manner as the highly reflective mirror 464.

The pulsed laser light 31 reflected by the highly reflective mirror 460 and then reflected by one or more highly reflective mirrors 462 and 464 may be shaped to have a certain beam cross section upon passing through the slit 430. The structure for causing parallel translation of the highly reflective mirrors 460 and 464 causes parallel translation of the beam axis, thereby suppressing an increase in the divergence of the pulsed laser light 32 due to changes in the beam axis AX. The highly reflective mirror 460 may be arranged upstream from the random phase plate 410 along the optical path of the pulsed laser light 31. In this case, the highly reflective mirror 464 may be arranged upstream from the random phase plate 410 along the optical path of the pulsed laser light 31.

5. Laser System Employing Master Oscillator Including Coherence Reduction Optical System in Combination with ArF Amplifier: Third Embodiment The laser system 1A in a third embodiment will now be described in detail with reference to some drawings.

5.1 Structure

Figure 11:
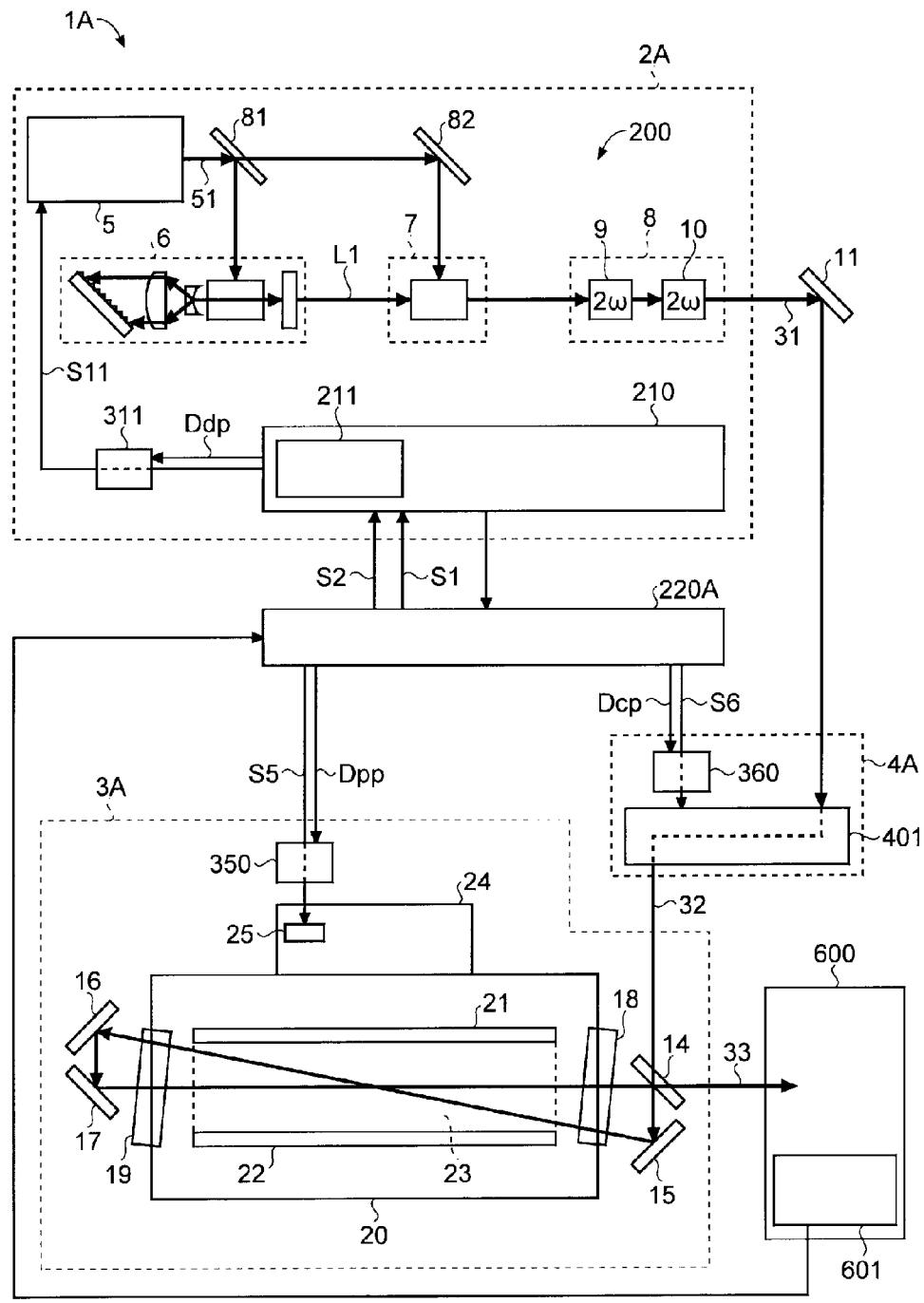
FIG. 11 is a schematic view illustrating a laser system in a third embodiment of this disclosure.

FIG. 11 is a schematic view illustrating the laser system 1A in the third embodiment. The laser system 1A may include a master oscillator 2A, the highly reflective mirror 11, the coherence reduction optical system 4A, an amplifying apparatus 3A, and a laser controller 220A. The laser controller 220A may control the operations of the laser system 1A. The coherence reduction optical system 4A may be replaced with any one of the coherence reduction optical systems 4B to 4E.

The master oscillator 2A may include a solid-state laser device 200 and a controller 210. The solid-state laser device 200 may include, like the master oscillator 2 illustrated in FIG. 1, the pumping laser 5, the Ti:sapphire laser 6 (seed laser), the amplifier 7, a wavelength conversion device 8 including the LBO crystal 9 and the KBBF crystal 10, the beam splitter 81, and the highly reflective mirror 82.

The controller 210 may be a synchronous controller for controlling timing at which the pulsed laser light 31 is output. This controller 210 may include an internal trigger oscillator 211. The internal trigger oscillator 211 may generate internal triggers at a predetermined repetition rate, for example. The controller 210 may send this internal trigger as a pumping laser oscillation signal S11 to the pumping laser 5.

The controller 210 may receive a trigger signal S1 substantially at a predetermined repetition rate from the laser controller 220A, which is an example of the external device 220, or other source. Based on the trigger signal S1 received from the laser controller 220A, the controller 210 may send the pumping laser oscillation signal S11 to the pumping laser 5. This allows the pumping laser 5 to continuously output the excitation light 51 substantially at a predetermined repetition rate.

The master oscillator 2A may include an oscillation delay circuit 311. The oscillation delay circuit 311 may delay the pumping laser oscillation signal S11 output from the controller 210 to the pumping laser 5 by a predetermined delay time (oscillation delay time Ddp) for adjusting timing with the amplifying apparatus 3A.

The amplifying apparatus 3A may include a laser power supply 24 and a switch delay circuit 350 in addition to the components of the amplifying apparatus 3 illustrated in FIG. 1. The laser power supply 24 may be electrically connected to the anode 21 and the cathode 22 in the chamber 20. The switch delay circuit 350 may delay a switch signal S5 output from the laser controller 220A to a switch 25 in the laser power supply 24 by a predetermined delay time (switch delay time Dpp).

The laser controller 220A may send a control signal S6 for driving the coherence reduction optical system 4A. The coherence reduction optical system 4A may include a control delay circuit 360. The control delay circuit 360 may delay the control signal S6 output from the laser controller 220A by a predetermined delay time (control delay time Dcp) for adjusting timing with the master oscillator 2A and the amplifying apparatus 3A.

5.2 Operations

The general operations of the laser system 1A will now be described. The laser controller 220A may be requested by an exposure controller 601 included in an exposure apparatus 600 to generate burst output of the pulsed laser light 33. Upon a request of burst output, the laser controller 220A may output a burst request signal S2 to the controller 210 in the master oscillator 2A. The laser controller 220A may output a trigger signal S1 to the controller 210 substantially at a predetermined repetition rate. The controller 210 may output the trigger signal S1 or an internal trigger generated by the internal trigger oscillator 211, as a pumping laser oscillation signal S11, to the pumping laser 5. The pumping laser oscillation signal S11 may be input to the pumping laser 5, delayed by a predetermined delay time (oscillation delay time Ddp) from the input of the trigger signal S1 by being routed through the oscillation delay circuit 311. The pumping laser 5 may output the excitation light 51 upon receiving the pumping laser oscillation signal S11. As a result, pulsed laser light L1 is generated in the solid-state laser device 200.

The laser controller 220A may output a switch signal S5 to the laser power supply 24 in the amplifying apparatus 3A substantially at a predetermined repetition rate. The laser controller 220A may output the switch signal S5 successively or only during a period for which the exposure controller 601 is requesting burst output. The switch signal S5 may be input to the switch 25 in the laser power supply 24, delayed by a predetermined delay time (switch delay time Dpp) from the input of the trigger signal S1 for the controller 210 by being routed through the switch delay circuit 350. When the switch signal S5 causes the switch 25 to turn on, the laser power supply 24 may apply a potential difference for discharge between the anode 21 and the cathode 22. This can cause a discharge in the discharge space 23 between the anode 21 and the cathode 22.

The timing at which a discharge is caused in the discharge space 23 is preferably synchronized with the timing at which the pulsed laser light 32 entering the amplifying apparatus 3A after being output from the master oscillator 2A via the coherence reduction optical system 4A passes through the chamber 20 (synchronization). The oscillation delay time Ddp and the switch delay time Dpp for achieving this synchronization may be obtained in advance by experience, experiment, or simulation, for example. At least one of the oscillation delay time Ddp and the switch delay time Dpp may be feedback-controlled based on the difference between the timing of the pulsed laser light and the timing of discharge.

The laser controller 220A may output a control signal S6 to the coherence reduction optical system 4A substantially at a predetermined repetition rate. The control signal S6 may be input to the motor driver 418 in the coherence reduction optical system 4A, delayed by a predetermined delay time (control delay time Dcp) from the input of the trigger signal S1 for the controller 210 by being routed through the control delay circuit 360. The timing at which the coherence reduction optical system 4A is driven may be after the pulsed laser light 31 passes through the coherence reduction optical system 4A or may be immediately before the pulsed laser light 31 passes through the coherence reduction optical system 4A.

5.3 Action

In the third embodiment, the laser controller 220A may drive the coherence reduction optical system 4A for every pulsed laser light 31. This can vary speckles of the pulsed laser light 32 having passed through the coherence reduction optical system 4A. Through the integration of the pulsed laser light 32 having differently varied speckles therein, the distribution of speckles can be averaged. As a result, the speckles of the pulsed laser light 32 can be reduced substantially.

5.4 Flowchart

The operations of the laser system 1A illustrated in FIG. 11 will now be described in detail with reference to some drawings. The operations in the first, second, and fourth examples of the second embodiment which are embodiments of the coherence reduction optical system will be described using FIG. 11 of the third embodiment, while the description of the operations in the third and fifth examples of the second embodiment is omitted herein.

In the operations of the laser system 1A, the control amount $\Delta\theta$ for the coherence reduction optical system 4A may be a given control amount $\Delta\theta$ determined in advance or may be a random control amount $\Delta\theta$ determined using random numbers, for example. Methods employing respective control amounts will be described.

5.4.1 Control Under Given Control Amount
5.4.1.1 Flowchart in First Example

Figure 12:
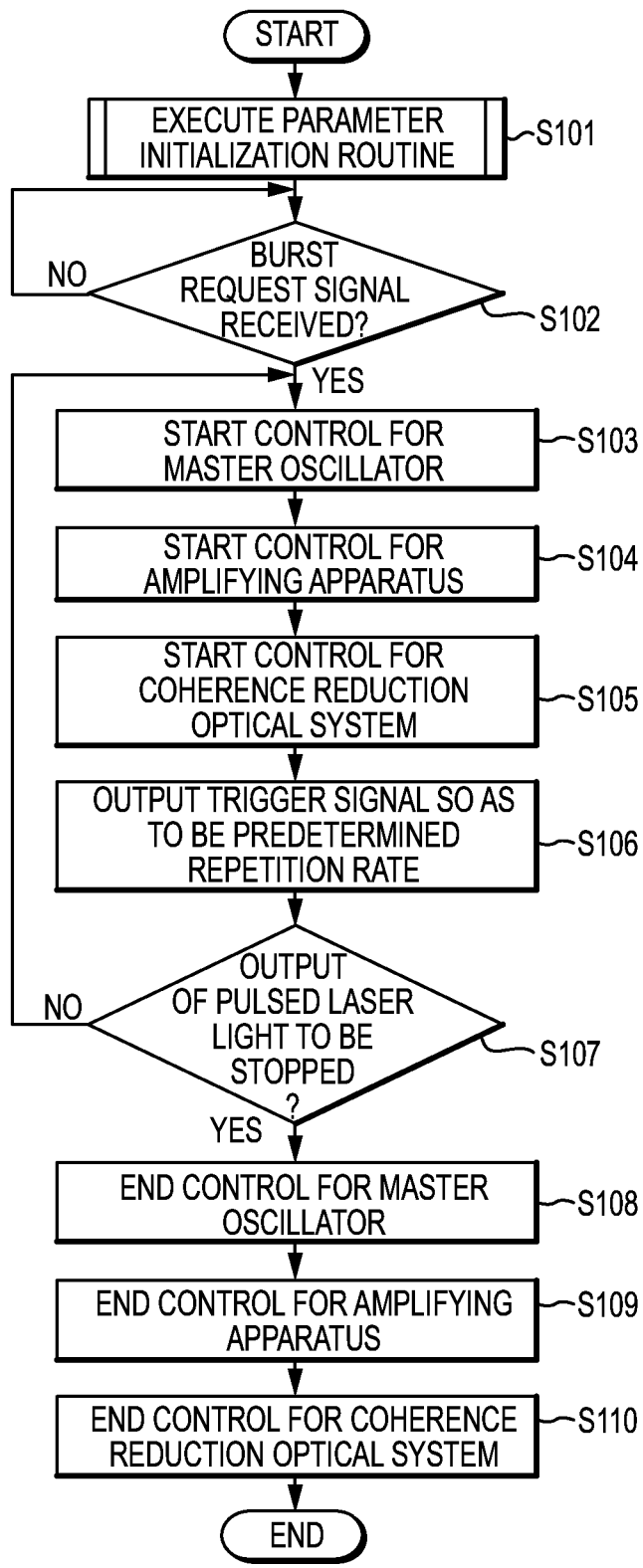
FIG. 12 is a flowchart illustrating the overall operation of the laser system in the third embodiment.
Figure 13:
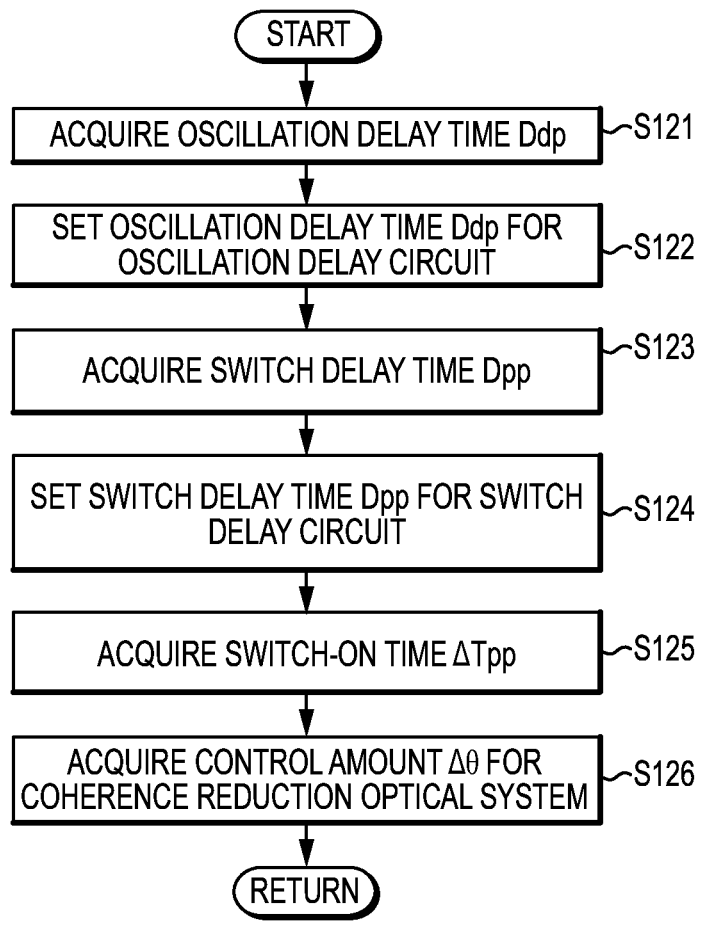
FIG. 13 is a flowchart illustrating the operation of a parameter initialization routine in step S101 of FIG. 12 in the case of using a given control amount.
Figure 14:
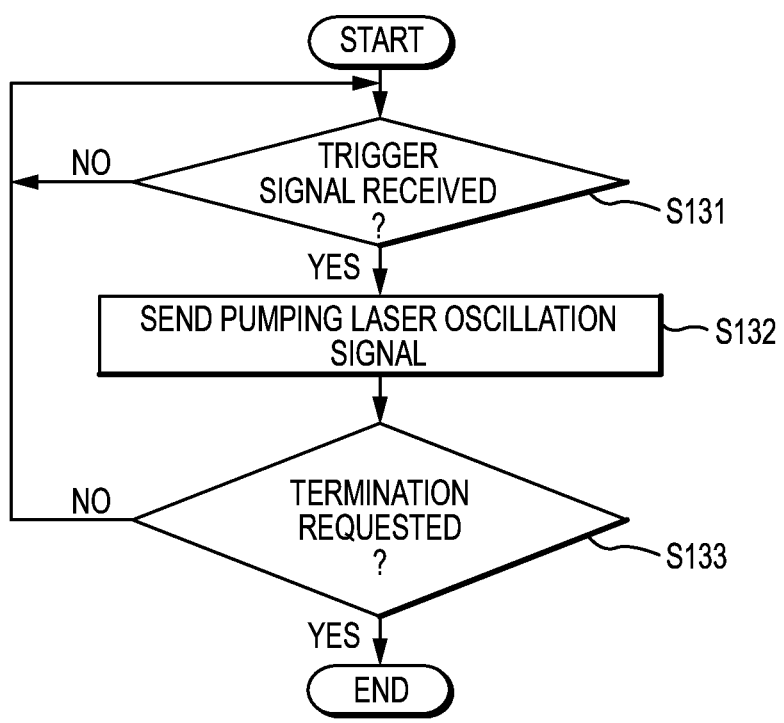
FIG. 14 is a flowchart illustrating an operation initiated by a controller in step S103 of FIG. 12.
Figure 15:
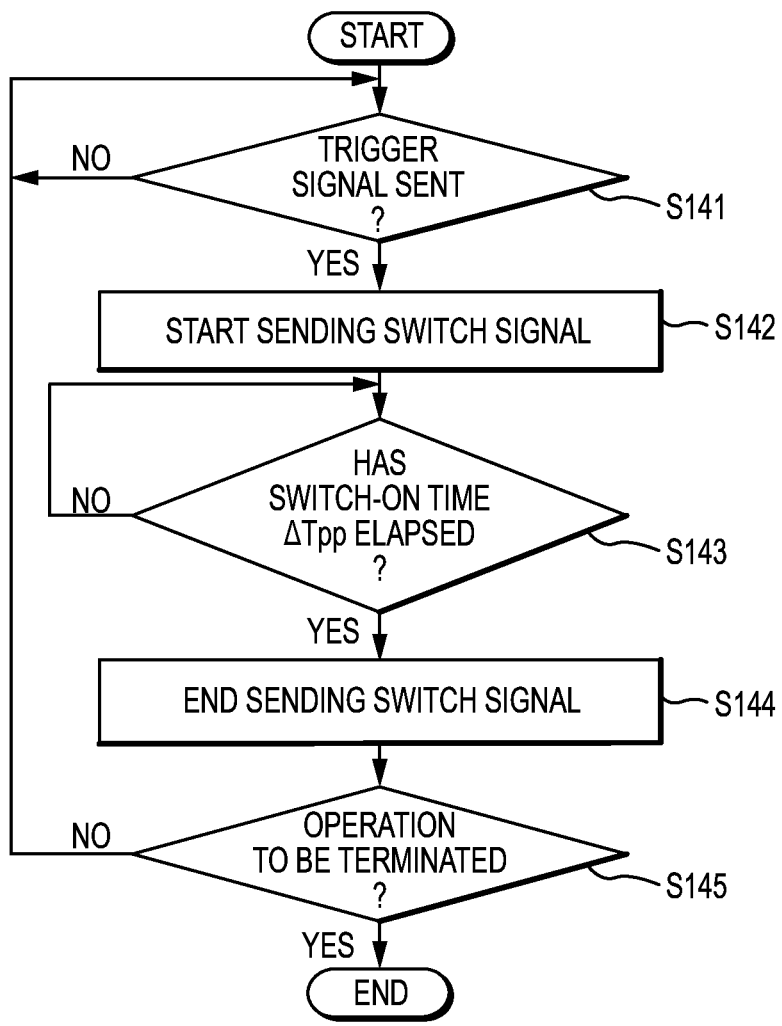
FIG. 15 is a flowchart illustrating an operation initiated by a laser controller in step S104 of FIG. 12.

The use of a given control amount $\Delta\theta$ will now be described. FIG. 12 is a flowchart illustrating the general operation of the laser system 1A. FIG. 13 is a flowchart illustrating the general operation of a parameter initialization routine in step S101 of FIG. 12. FIG. 14 is a flowchart illustrating the operation initiated by the controller 210 in step S103 of FIG. 12. FIG. 15 is a flowchart illustrating the operation initiated by the laser controller 220A in step S104 of FIG. 12. FIGS. 12, 13, and 15 illustrate the operations performed by the laser controller 220A, while FIG. 14 illustrates the operation performed by the controller 210.

As illustrated in FIG. 12, the laser controller 220A may execute a parameter initialization routine for initializing various parameters after start-up (step S101). The parameters to be initialized may be registered in advance, or input or required externally by, for example, the exposure controller 601.

The laser controller 220A may then wait until it receives a burst request signal for requesting burst output of the pulsed laser light 33 by, for example, the exposure controller 601 (step S102; NO). Upon receiving a burst request signal (step S102; YES), the laser controller 220A may start control for causing the master oscillator 2A to generate burst output of the pulsed laser light 31 (step S103). The laser controller 220A may also start control for causing a discharge in the amplifying apparatus 3A (step S104). The laser controller 220A may then start control for driving the coherence reduction optical system 4A for every pulsed laser light 31 (step S105).

Next, the laser controller 220A may output a trigger signal S1 to the controller 210 at a predetermined repetition rate (step S106).

Subsequently, the laser controller 220A may determine whether to stop the output of the pulsed laser light 33 (step S107). If it is determined to stop the output (step S107; YES), the laser controller 220A may end the control for the master oscillator 2A started in step S103 (step S108). The laser controller 220A may also end the control for the amplifying apparatus 3A started in step S104 (step S109). Furthermore, the laser controller 220A may end the control for the coherence reduction optical system 4A started in step S105 (step S110), and the present operation may be ended thereafter. If it is determined not to stop the output (step S107; NO), the laser controller 220A may return to step S103 to execute the subsequent steps.

The operation of the parameter initialization routine in step S101 of FIG. 12 will now be described. In the parameter initialization routine illustrated in FIG. 13, the laser controller 220A may acquire the oscillation delay time Ddp to be set for the oscillation delay circuit 311 (step S121). The oscillation delay time Ddp thus acquired may be an initial value stored in a memory (not illustrated) or the like in advance or a value newly calculated by the laser controller 220A. The laser controller 220A may then set the acquired oscillation delay time Ddp for the oscillation delay circuit 311 through the controller 210 (step S122). This may delay the timing of a pumping laser oscillation signal S11 passing through the oscillation delay circuit 311 by the oscillation delay time Ddp.

Next, the laser controller 220A may acquire the switch delay time Dpp to be set for the switch delay circuit 350 (step S123). The switch delay time Dpp thus acquired may be an initial value stored in a memory (not illustrated) or the like in advance or a value newly calculated by the laser controller 220A. The laser controller 220A may then set the acquired switch delay time Dpp for the switch delay circuit 350 (step S124). This may delay the timing of the switch signal S5 passing through the switch delay circuit 350 by the switch delay time Dpp.

Next, the laser controller 220A may acquire a time (switch-on time $\Delta$Tpp) for which the switch 25 is kept on, in other words, a discharge voltage is applied between the anode 21 and the cathode 22 (step S125). The switch-on time $\Delta$Tpp thus acquired may be an initial value stored in a memory (not illustrated) or the like in advance or a value newly calculated by the laser controller 220A.

Next, the laser controller 220A may acquire a control amount $\Delta\theta$ for driving the coherence reduction optical system 4A for every pulsed laser light 31 (step S126). The control amount $\Delta\theta$ thus acquired may be an initial value stored in a memory (not illustrated) or the like in advance or a value newly calculated by the laser controller 220A. The laser controller 220A may then return to the operation illustrated in FIG. 12.

The operation initiated by the controller 210 in step S103 of FIG. 12 will now be described. As illustrated in FIG. 14, under the control of the laser controller 220A, the controller 210 may wait until it receives a trigger signal S1 from the laser controller 220A, for example (step S131; NO).

Upon receiving a trigger signal S1 (step S131; YES), the controller 210 may send the trigger signal S1 as a pumping laser oscillation signal S11 to the pumping laser 5 (step S132). The pumping laser oscillation signal S11 may be input into the pumping laser 5 through the oscillation delay circuit 311. The timing at which the pumping laser 5 outputs the excitation light 51 may be directly related to the timing at which the Ti:sapphire laser 6 outputs the pulsed laser light L1.

Subsequently, the controller 210 may determine whether a termination instruction for the operation has been input by the laser controller 220A, for example (step S133). If a termination instruction has been input (step S133; YES), the controller 210 may terminate the present operation. If a termination instruction has not been input (step S133; NO), the controller 210 may return to step S131.

The operation initiated by the laser controller 220A in step S104 of FIG. 12 will now be described. As illustrated in FIG. 15, the laser controller 220A may wait until it outputs a trigger signal S1 to the controller 210 (step S141; NO). After outputting a trigger signal S1 (step S141; YES), the laser controller 220A may start sending a switch signal S5 to the switch 25 (step S142). The switch signal S5 may be input into the switch 25 through the switch delay circuit 350. For the switch delay circuit 350, the switch delay time Dpp may be set so that a discharge occurs in the discharge space 23 in synchronization with the timing at which the pulsed laser light 32 passes through the discharge space 23.

Subsequently, the laser controller 220A may measure an elapsed time from the start of sending the switch signal S5 with a timer (not illustrated), for example. The laser controller 220A may wait until the time thus measured reaches or exceeds the switch-on time ΔTpp set in advance (step S143; NO).

After the switch-on time ΔTpp has elapsed (step S143; YES), the laser controller 220A may end sending the switch signal S5 (step S144). This may adjust a period for which a discharge occurs in the discharge space 23. The laser controller 220A may then determine whether to terminate the operation (step S145). If it is determined to terminate the operation (step S145; YES), the laser controller 220A may terminate the present operation. If it is determined not to terminate the operation (step S145; NO), the laser controller 220A may return to step S141.

Figure 16:
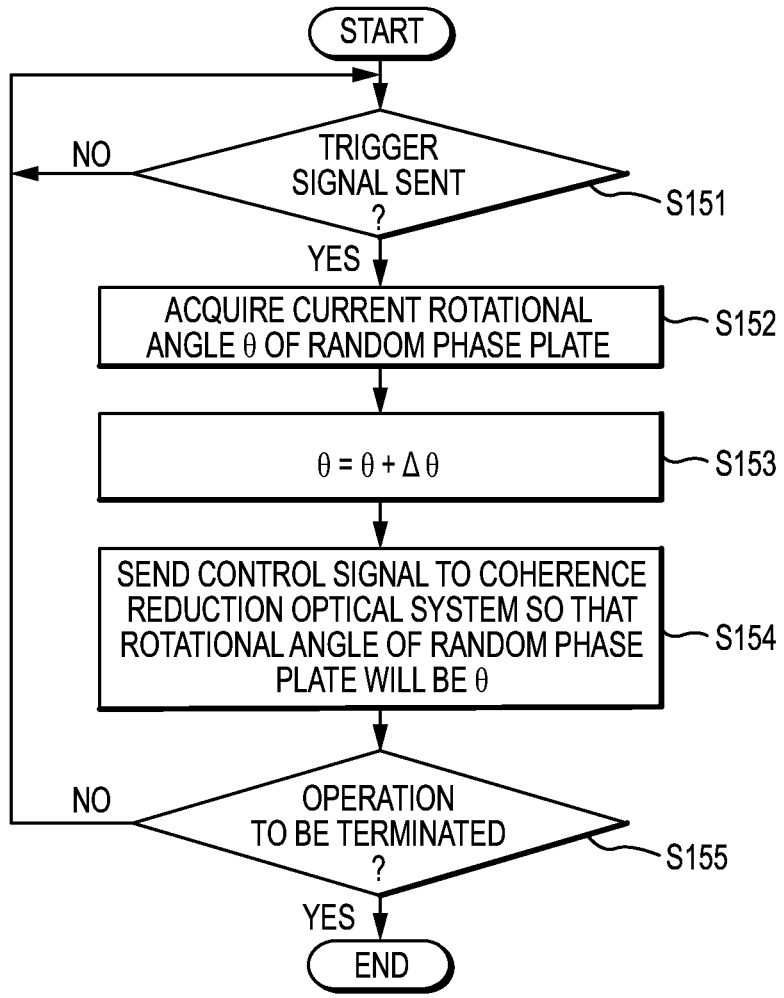
FIG. 16 is a flowchart illustrating an operation initiated by the laser controller in step S105 of FIG. 12 in the case of using a given control amount in the third embodiment employing the first example of the second embodiment.

The operation initiated by the laser controller 220A in step S105 of FIG. 12 will now be described. FIG. 16 is a flowchart illustrating the operation initiated by the laser controller 220A in step S105 of FIG. 12. The operation example illustrated in FIG. 16 employs the first example of the second embodiment.

As illustrated in FIG. 16, the laser controller 220A may wait until it outputs a trigger signal S1 to the controller 210 (step S151; NO). After outputting a trigger signal S1 (step S151; YES), the laser controller 220A may acquire the current rotational angle θ of the random phase plate 410 in the coherence reduction optical system 4A (step S152). The current rotational angle θ of the random phase plate 410 may be controlled by the motor driver 418, for example.

Next, the laser controller 220A may add the control amount Δθ to the current rotational angle θ so as to determine a target rotational angle θ of the random phase plate 410 (step S153). The laser controller 220A may then send a control signal S6 to the coherence reduction optical system 4A so that the rotational angle θ of the random phase plate 410 will be the newly determined rotational angle θ (step S154).

Subsequently, the laser controller 220A may determine whether to terminate the operation (step S155). If it is determined to terminate the operation (step S155; YES), the laser controller 220A may terminate the present operation. If it is determined not to terminate the operation (step S155; NO), the laser controller 220A may return to step S151.

5.4.1.2 Flowchart in Second Example

Figure 17:
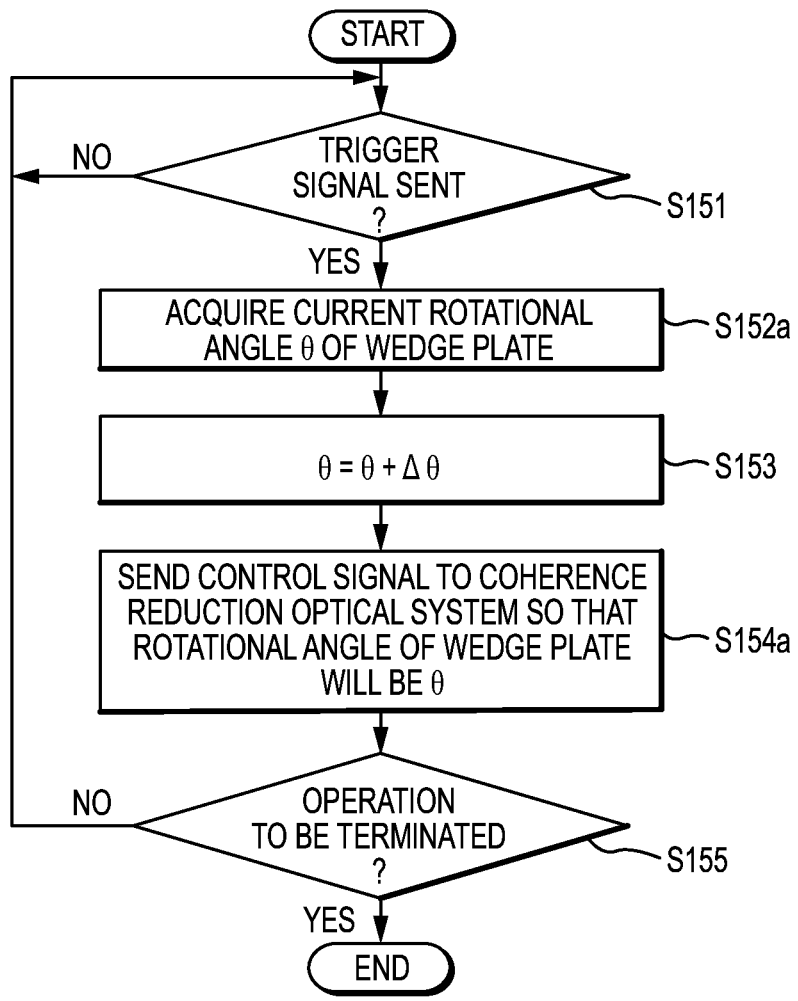
FIG. 17 is a flowchart illustrating an operation initiated by the laser controller in step S105 of FIG. 12 in the case of using a given control amount in the third embodiment employing the second example of the second embodiment.

The operation initiated by the laser controller 220A in step S105 of FIG. 12 employing the second example of the second embodiment will now be described. FIG. 17 is a flowchart illustrating the operation initiated by the laser controller 220A in step S105 of FIG. 12.

As illustrated in FIG. 17, the laser controller 220A may wait until it outputs a trigger signal S1 to the controller 210 (step S151; NO). After outputting a trigger signal S1 (step S151; YES), the laser controller 220A may acquire the current rotational angle θ of the wedge substrate 420 in the coherence reduction optical system 4B (step S152a). The current rotational angle θ of the wedge substrate 420 may be controlled by the motor driver 428, for example.

Next, the laser controller 220A may add the control amount Δθ to the current rotational angle θ so as to calculate a target rotational angle θ of the wedge substrate 420 (step S153). The laser controller 220A may then send a control signal S6 to the coherence reduction optical system 4B so that the rotational angle θ of the wedge substrate 420 will be the newly calculated rotational angle θ (step S154a).

Subsequently, the laser controller 220A may determine whether to terminate the operation (step S155). If it is determined to terminate the operation (step S155; YES), the laser controller 220A may terminate the present operation. If it is determined not to terminate the operation (step S155; NO), the laser controller 220A may return to step S151.

5.4.1.3 Flowchart in Fourth Example

Figure 18:
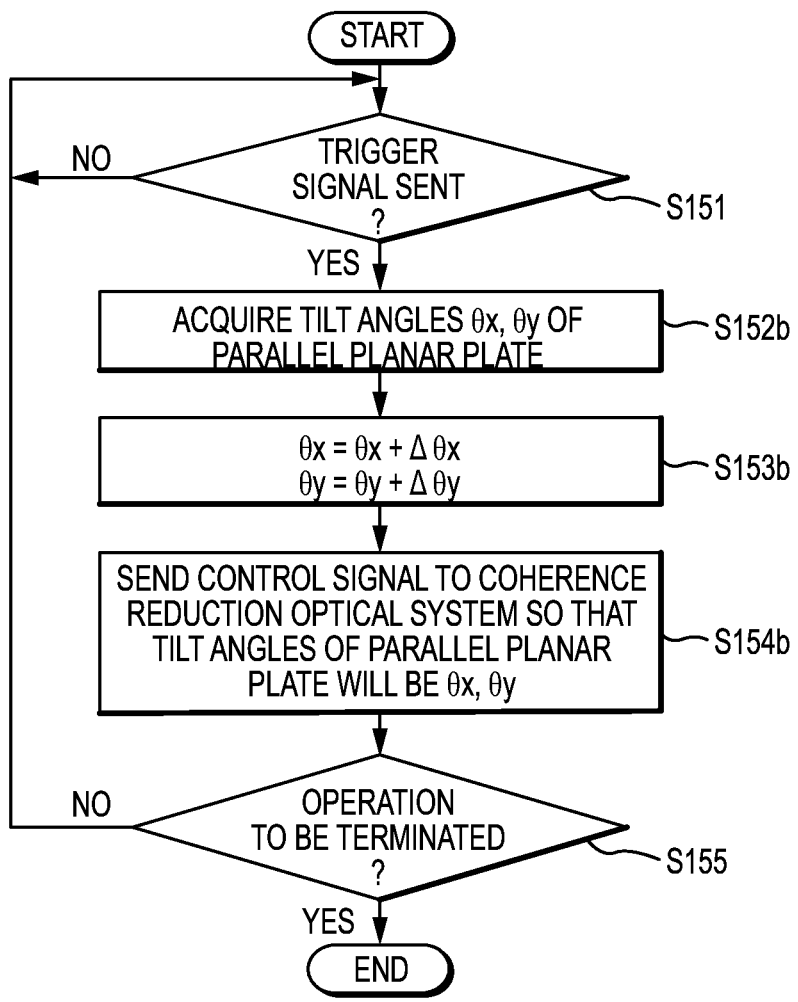
FIG. 18 is a flowchart illustrating an operation initiated by the laser controller in step S105 of FIG. 12 in the case of using a given control amount in the third embodiment employing the fourth example of the second embodiment.

The operation initiated by the laser controller 220A in step S105 of FIG. 12 employing the fourth example of the second embodiment will now be described. FIG. 18 is a flowchart illustrating the operation initiated by the laser controller 220A in step S105 of FIG. 12.

As illustrated in FIG. 18, the laser controller 220A may wait until it outputs a trigger signal S1 to the controller 210 (step S151; NO). After outputting a trigger signal S1 (step S151; YES), the laser controller 220A may acquire the current tilt angles θx and θy of the plane parallel plate 450 in the coherence reduction optical system 4D (step S152b). The current tilt angles θx and θy of the plane parallel plate 450 may be controlled by the motor driver 458, for example.

Next, the laser controller 220A may add the control amount Δθ to the current tilt angles θx and θy so as to determine target tilt angles θx and θy of the plane parallel plate 450 (step S153b). In this example, the control amount Δθ acquired in step S126 of FIG. 13 is a control amount Δθ (Δθx, Δθy) for the tilt angles of the plane parallel plate 450. The laser controller 220A may then send a control signal S6 to the coherence reduction optical system 4D so that the tilt angles θx and θy of the plane parallel plate 450 will be the newly determined tilt angles θx and θy (step S154b).

Subsequently, the laser controller 220A may determine whether to terminate the operation (step S155). If it is determined to terminate the operation (step S155; YES), the laser controller 220A may terminate the present operation. If it is determined not terminate the operation (step S155; NO), the laser controller 220A may return to step S151.

5.4.2 Control Under Random Control Amount

The use of a random control amount Δθ will now be described. The general operation of the laser system 1A in this case is the same as or similar to the general operation illustrated in FIG. 12, and therefore the detailed description thereof is omitted. The operation initiated by the controller 210 in step S103 in FIG. 12 and the operation initiated by the laser controller 220A in step S104 of FIG. 12 are the same as or similar to the corresponding operations in FIGS. 14 and 15, and therefore the detailed description thereof is omitted.

5.4.2.1 Flowchart in First Example

Figure 19:
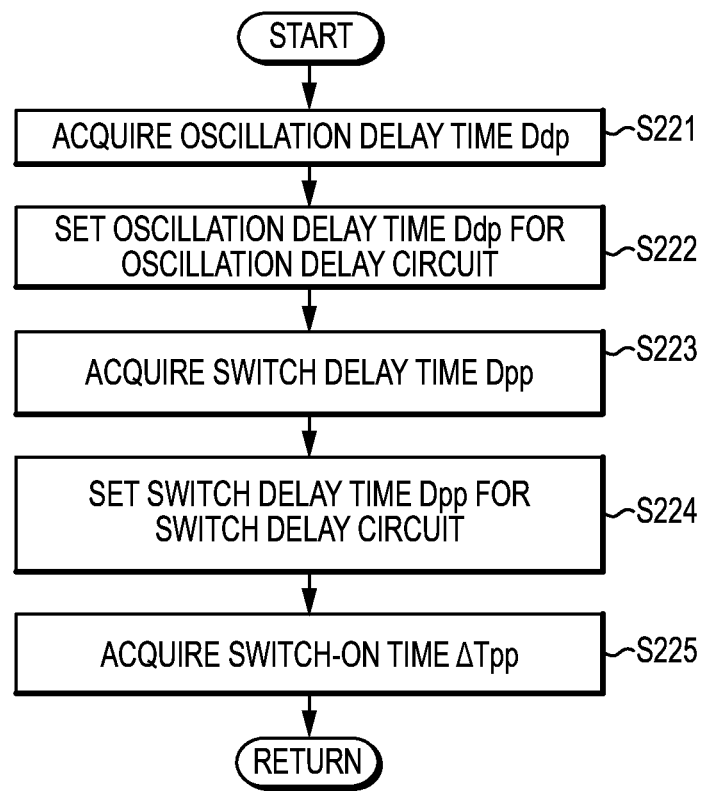
FIG. 19 is a flowchart illustrating the operation of the parameter initialization routine in step S101 of FIG. 12 in the case of using a random control amount.

FIG. 19 is a flowchart illustrating the general operation of the parameter initialization routine in step S101 of FIG. 12. In the parameter initialization routine illustrated in FIG. 19, the laser controller 220A may acquire the oscillation delay time Ddp to be set for the oscillation delay circuit 311 (step S221). The oscillation delay time Ddp thus acquired may be an initial value stored in a memory (not illustrated) or the like in advance or a value newly calculated by the laser controller 220A. The laser controller 220A may then set the acquired oscillation delay time Ddp for the oscillation delay circuit 311 through the controller 210 (step S222). The laser controller 220A may set the oscillation delay time Ddp for the oscillation delay circuit 311 through the controller 210 as illustrated in FIG. 11. This may delay the timing of a pumping laser oscillation signal S11 passing through the oscillation delay circuit 311 by the oscillation delay time Ddp.

Next, the laser controller 220A may acquire the switch delay time Dpp to be set for the switch delay circuit 350 (step S223). The switch delay time Dpp thus acquired may be an initial value stored in a memory (not illustrated) or the like in advance or a value newly calculated by the laser controller 220A. The laser controller 220A may then set the acquired switch delay time Dpp for the switch delay circuit 350 (step S224). This may delay the timing of the switch signal S5 passing through the switch delay circuit 350 by the switch delay time Dpp.

Next, the laser controller 220A may acquire a time (switch-on time ΔTpp) for which the switch 25 is kept on, in other words, a discharge voltage is applied between the anode 21 and the cathode 22 (step S225). The switch-on time ΔTpp thus acquired may be an initial value stored in a memory (not illustrated) or the like in advance or a value newly calculated by the laser controller 220A. Subsequently, the laser controller 220A may return to the operation illustrated in FIG. 12.

Figure 20:
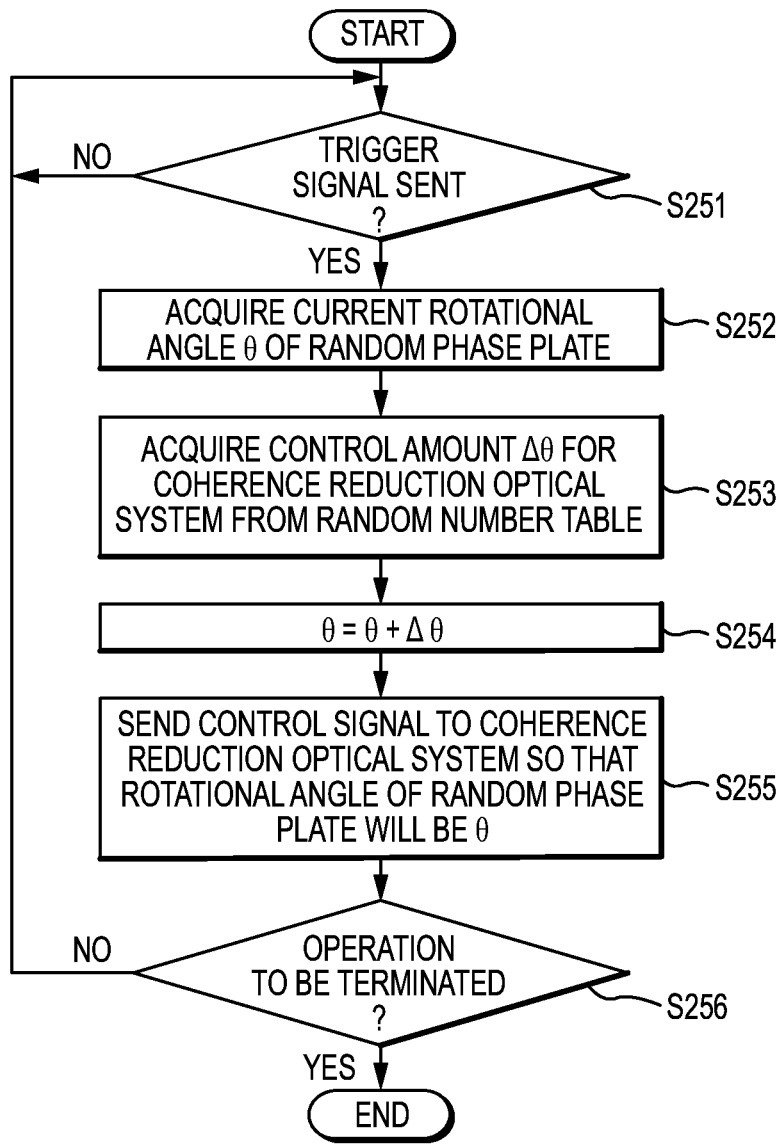
FIG. 20 is a flowchart illustrating an operation initiated by the laser controller in step S105 of FIG. 12 in the case of using a random control amount in the third embodiment employing the first example of the second embodiment.

The operation initiated by the laser controller 220A in step S105 of FIG. 12 will now be described. FIG. 20 is a flowchart illustrating the operation initiated by the laser controller 220A in step S105 of FIG. 12. The operation example illustrated in FIG. 20 employs the first example of the second embodiment.

As illustrated in FIG. 20, the laser controller 220A may wait until it outputs a trigger signal S1 to the controller 210 (step S251; NO). After outputting a trigger signal S1 (step S251; YES), the laser controller 220A may acquire the current rotational angle θ of the random phase plate 410 in the coherence reduction optical system 4A (step S252). The current rotational angle θ of the random phase plate 410 may be controlled by the motor driver 418, for example.

Next, the laser controller 220A may acquire a control amount Δθ for the coherence reduction optical system 4A from a random number table stored in a memory (not illustrated) or the like in advance (step S253). The control amount Δθ acquired from the random number table may be a random value.

Next, the laser controller 220A may add the control amount Δθ to the current rotational angle θ so as to calculate a target rotational angle θ of the random phase plate 410 (step S254). The laser controller 220A may then send a control signal S6 to the coherence reduction optical system 4A so that the rotational angle θ of the random phase plate 410 will be the newly calculated rotational angle θ (step S255).

Subsequently, the laser controller 220A may determine whether to terminate the operation (step S256). If it is determined to terminate the operation (step S256; YES), the laser controller 220A may terminate the present operation. If it is determined not to terminate the operation (step S256; NO), the laser controller 220A may return to step S251.

5.4.2.2 Flowchart in Second Example

Figure 21:
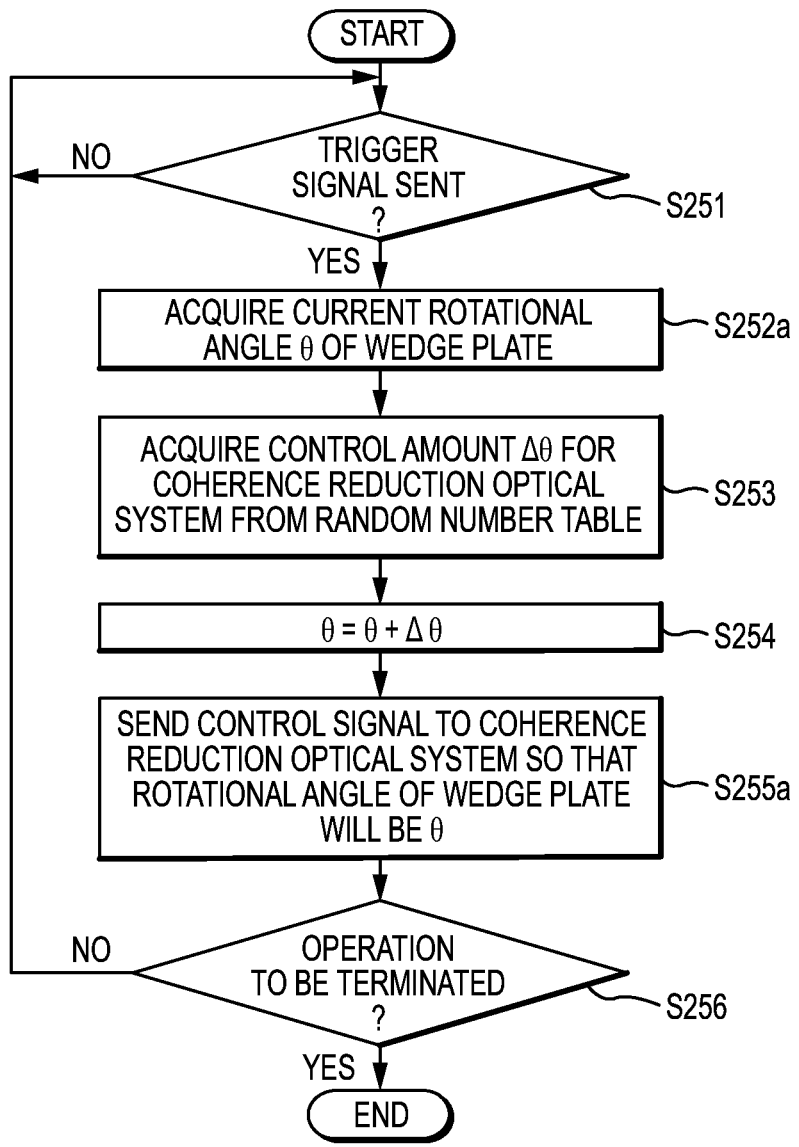
FIG. 21 is a flowchart illustrating an operation initiated by the laser controller in step S105 of FIG. 12 in the case of using a random control amount in the third embodiment employing the second example of the second embodiment.

The operation initiated by the laser controller 220A in step S105 of FIG. 12 employing the second example of the second embodiment will now be described. FIG. 21 is a flowchart illustrating the operation initiated by the laser controller in step S105 of FIG. 12.

As illustrated in FIG. 21, the laser controller 220A may wait until it outputs a trigger signal S1 to the controller 210 (step S251; NO). After outputting a trigger signal S1 (step S251; YES), the laser controller 220A may acquire the current rotational angle θ of the wedge substrate 420 in the coherence reduction optical system 4B (step S252a). The current rotational angle θ of the wedge substrate 420 may be controlled by the motor driver 428, for example.

Next, the laser controller 220A may acquire a control amount Δθ for the coherence reduction optical system 4B from a random number table stored in a memory (not illustrated) or the like in advance (step S253). The control amount Δθ acquired from the random number table may be a random value.

Next, the laser controller 220A may add the control amount Δθ to the current rotational angle θ so as to calculate a target rotational angle θ of the wedge substrate 420 (step S254). The laser controller 220A may then send a control signal S6 to the coherence reduction optical system 4B so that the rotational angle θ of the wedge substrate 420 will be the newly calculated rotational angle θ (step S255a).

Subsequently, the laser controller 220A may determine whether to terminate the operation (step S256). If it is determined to terminate the operation (step S256; YES), the laser controller 220A may terminate the present operation. If it is determined not to terminate the operation (step S256; NO), the laser controller 220A may return to step S251.

5.4.2.3 Flowchart in Fourth Example

Figure 22:
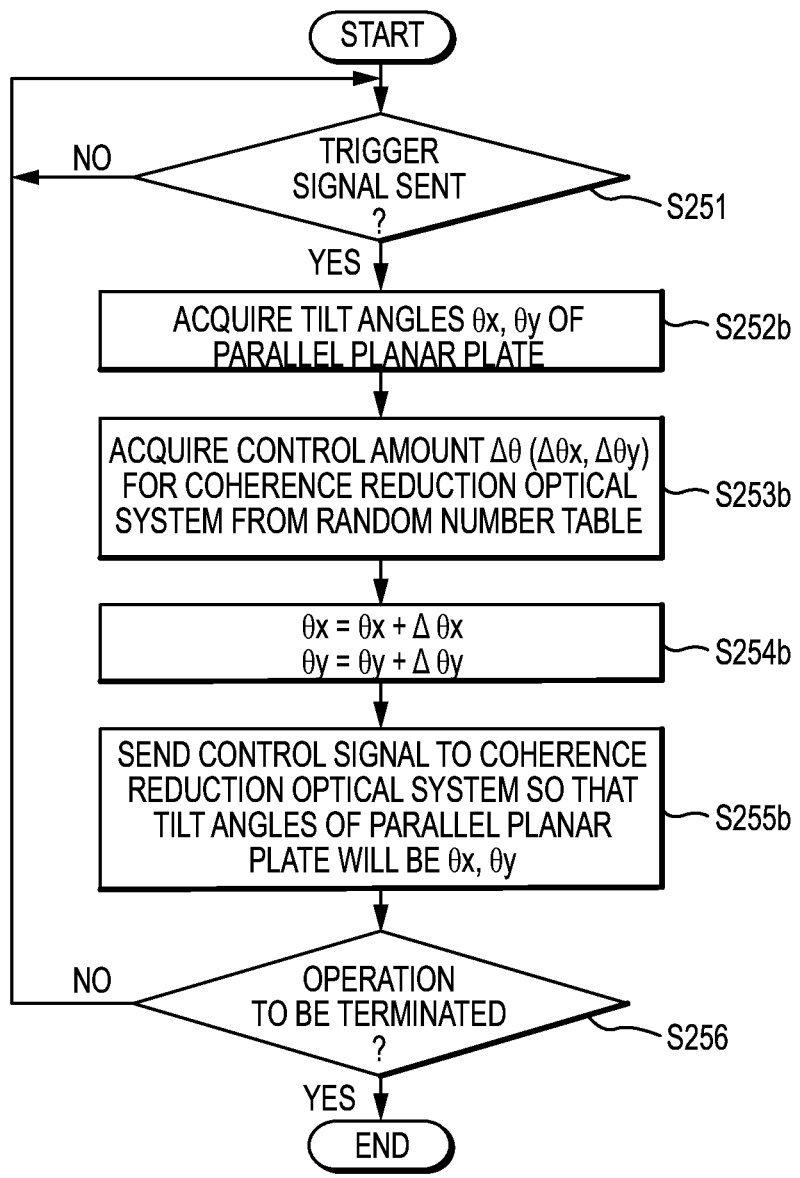
FIG. 22 is a flowchart illustrating an operation initiated by the laser controller in step S105 of FIG. 12 in the case of using a random control amount in the third embodiment employing the fourth example of the second embodiment.

The operation initiated by the laser controller 220A in step S105 of FIG. 12 employing the fourth example of the second embodiment will now be described. FIG. 22 is a flowchart illustrating the operation initiated by the laser controller 220A in step S105 of FIG. 12.

As illustrated in FIG. 22, the laser controller 220A may wait until it outputs a trigger signal S1 to the controller 210 (step S251; NO). After outputting a trigger signal S1 (step S251; YES), the laser controller 220A may acquire the current tilt angles θx and θy of the plane parallel plate 450 in the coherence reduction optical system 4D (step S252b). The current tilt angles θx and θy of the plane parallel plate 450 may be controlled by the motor driver 458, for example.

Next, the laser controller 220A may acquire a control amount Δθ (Δθx, Δθy) for the coherence reduction optical system 4D from a random number table stored in a memory (not illustrated) or the like in advance (step S253b). The control amount Δθ (Δθx, Δθy) acquired from the random number table may be a random value.

Next, the laser controller 220A may add the control amount Δθ (Δθx, Δθy) acquired from the random number table to the current tilt angles θx and θy so as to calculate target tilt angles θx and θy of the plane parallel plate 450 (step S254b). The laser controller 220A may then send a control signal S6 to the coherence reduction optical system 4D so that the tilt angles θx and θy of the plane parallel plate 450 will be the newly calculated tilt angles θx and θy (step S255b).

Subsequently, the laser controller 220A may determine whether to terminate the operation (step S256). If it is determined to terminate the operation (step S256; YES), the laser controller 220A may terminate the present operation. If it is determined not to terminate the operation (step S256; NO), the laser controller 220A may return to step S251.

The description above is not intended to be limiting, but only to provide examples. It is clear for the skilled person that various changes and modifications can be made in the embodiments in this disclosure without departing from the spirit and scope of the appended claims.

The terms used in this specification and the appended claims should be construed as non-limiting. For example, the terms "comprise" and "include" should be construed as "include but not be limited to." The term "have" should be construed as "have but not be limited to." The indefinite article "a/an" used in this specification and the appended claims should be construed as "at least one" or "one or more."

While a single amplifier 7 is provided in the embodiments described above, a plurality of amplifiers 7 may be used instead. While the Ti:sapphire laser 6 and the amplifier 7 are pumped by the common pumping laser 5, separate pumping lasers may be used instead. As the pumping laser 5, a laser that generates second harmonic light of an Nd:YLF laser or an Nd:YVO$_4$ laser may be used. Instead of the Ti:sapphire laser 6, a laser that generates second harmonic light of an erbium-doped optical fiber laser may be used. This laser may be pumped by a semiconductor laser. The wavelength conversion device 8 is not limited to the structures described in this disclosure, and may take any form as long as it converts incident light into light whose wavelength is in the gain bandwidth of the amplifying apparatus 3, e.g., approximately 193 nm. Examples of wavelength conversion elements included in the wavelength conversion device 8 may include a cesium lithium triborate (CLBO) crystal, instead of the LBO crystal 9.

What is claimed is:

1. A laser system, comprising:
    a master oscillator configured to output pulsed laser light;
    a coherence reduction optical system configured to reduce coherence of the pulsed laser light from the master oscillator, the coherence reduction optical system having a phase modulator which includes cells arranged with different thicknesses; and
    a controller configured to control the coherence reduction optical system so that a speckle of the pulsed laser light varies.

2. The laser system according to claim 1, wherein the controller is configured to control the coherence reduction optical system so that the speckle varies for each laser pulse of the pulsed laser light.

3. The laser system according to claim 1, wherein the coherence reduction optical system further includes a rotation mechanism configured to rotate the phase modulator.

4. The laser system according to claim 1, wherein the coherence reduction optical system further includes:
    a transparent wedge substrate having an output surface tilted with respect to an input surface on which the pulsed laser light is incident; and
    a rotation mechanism configured to rotate the wedge substrate.

5. The laser system according to claim 1, wherein the coherence reduction optical system further includes:
    a mirror configured to reflect the pulsed laser light; and
    a tilt stage configured to change tilt of the minor with respect to an incident axis of the pulsed laser light.

6. The laser system according to claim 1, wherein the coherence reduction optical system further includes:
    a transparent plane parallel plate having an input surface and an output surface of the pulsed laser light that are parallel to each other; and
    a tilt stage configured to change tilt of the plane parallel plate with respect to an incident axis of the pulsed laser light.

7. The laser system according to claim 1, wherein the coherence reduction optical system further includes:
    a mirror configured to reflect the pulsed laser light; and
    a shifting mechanism configured to change a distance between the mirror and the random phase plate.

8. The laser system according to claim 1, further comprising an amplifying apparatus configured to amplify pulsed laser light having passed through the coherence reduction optical system.

9. A laser light generation method comprising:
    outputting pulsed laser light from a master oscillator;
    reducing coherence of the pulsed laser light outputted from the master oscillator by a coherence reduction optical system having a phase modulator which includes cells arranged with different thicknesses; and
    controlling the coherence reduction optical system so that a speckle of the pulsed laser light varies.

10. The method according to claim 9, wherein the coherence reduction optical system is controlled so that the speckle varies for each laser pulse of the pulsed laser light.

11. The method according to claim 10, wherein the coherence reduction optical system is controlled so that the speckle varies by a given amount for each laser pulse of the pulsed laser light.

12. The method according to claim 10, wherein the coherence reduction optical system is controlled so that the speckle varies in a random manner for each laser pulse of the pulsed laser light.

13. The laser system according to claim 1, wherein the phase modulator is a plate having the cells arranged two-dimensionally with different thicknesses.

14. The laser system according to claim 1, wherein the pulsed laser light from the master oscillator passes through the cells of the phase modulator.

15. The method according to claim 9, wherein the pulsed laser light outputted from the master oscillator passes through the cells of the phase modulator.

* * * * *